United States Patent
Gopal et al.

(10) Patent No.: US 11,552,684 B2
(45) Date of Patent: Jan. 10, 2023

(54) TECHNIQUES FOR REORDERING ANTENNA ORDER TO AVOID TRANSMIT BLANKING

(71) Applicant: QUALCOMM Incorporated, San Diego, CA (US)

(72) Inventors: Thawatt Gopal, San Diego, CA (US); Reza Shahidi, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/446,434

(22) Filed: Aug. 30, 2021

(65) Prior Publication Data

US 2022/0069873 A1 Mar. 3, 2022

Related U.S. Application Data

(60) Provisional application No. 63/072,643, filed on Aug. 31, 2020.

(51) Int. Cl.
*H04L 5/12* (2006.01)
*H04B 7/06* (2006.01)
(Continued)

(52) U.S. Cl.
CPC ...... *H04B 7/0608* (2013.01); *H04W 74/0858* (2013.01); *H04W 76/16* (2018.02); *H04B 7/0626* (2013.01)

(58) Field of Classification Search
CPC ... H04B 7/0608; H04B 7/0626; H04W 76/16; H04W 74/0858
(Continued)

(56) References Cited

U.S. PATENT DOCUMENTS

2020/0170027 A1* 5/2020 Yang ............... H04B 7/088

FOREIGN PATENT DOCUMENTS

| EP | 3661097 A1 | 6/2020 |
| WO | WO-2020019100 A1 | 1/2020 |
| WO | WO-2021076580 A1 | 4/2021 |

OTHER PUBLICATIONS

Intel Corporation: "Discussion on SRS Enhancements", 3GPP Draft, 3GPP TSG RAN WG1 Meeting #102-e, R1-2005863, 3rd Generation Partnership Project (3GPP), Mobile Competence Centre, 650, Route Des Lucioles, F-06921 Sophia-Antipolis Cedex, France, vol. RAN WG1, No. e-Meeting; Aug. 17, 2020-Aug. 28, 2020, Aug. 8, 2020 (Aug. 8, 2020), pp. 1-13, XP051917764, Retrieved from the Internet: URL: https://ftp.3gpp.org/tsg_ran/WG1_RL1/TSGR1_102-e/Docs/R1-2005863.zip, R1-2005863 Intel—Discussion on SRS enhancements.docx [retrieved on Aug. 8, 2020], The whole document.

(Continued)

*Primary Examiner* — Zewdu A Kassa
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may identify at least one collision between a periodic reporting of channel state information associated with a first radio access technology (RAT) and a periodic reference signal transmission associated with a second RAT, wherein each reference signal transmission of the periodic reference signal transmission is sequentially transmitted via a plurality of antennas based at least in part on a first antenna order. The UE may determine a second antenna order for the periodic reference signal transmission that resolves the at least one collision. The UE may transmit the periodic reference signal (Continued)

transmission using the second antenna order. Numerous other aspects are provided.

30 Claims, 11 Drawing Sheets

(51) Int. Cl.
  *H04W 76/16* (2018.01)
  *H04W 74/08* (2009.01)
(58) Field of Classification Search
  USPC ........ 375/262, 261, 260, 259, 219, 295, 316
  See application file for complete search history.

(56) References Cited

OTHER PUBLICATIONS

International Search Report and Written Opinion—PCT/US2021/071323—ISA/EPO—dated Jan. 4, 2022.
ZTE: "Enhancements on SRS Flexibility, Coverage and Capacity", 3GPP TSG RAN WG1 Meeting #102-e, R1-2006963, 3rd Generation Partnership Project (3GPP), Mobile Competence Centre, 650, Route Des Lucioles, F-06921 Sophia-Antipolis Cedex, France, vol. RAN WG1, No. eMeeting, Aug. 17, 2020-Aug. 28, 2020, 10 Pages, Aug. 28, 2020 (Aug. 28, 2020), Retrieved from the Internet: URL: https://ftp.3gpp.org/tsg_ran/WG1_RL1/TSGR1_102-e/Docs/R1-2006963.zip, R1-2006963 Enhancements on SRS flexibility, coverage and capacity.docx [retrieved on Aug. 11, 2020], section 2, section 4.3, p. 1-p. 6 figures 3, 4.

\* cited by examiner

TECHNIQUES FOR REORDERING ANTENNA ORDER TO AVOID TRANSMIT BLANKING

CROSS-REFERENCE TO RELATED APPLICATION

This Patent Application claims priority to U.S. Provisional Patent Application No. 63/072,643, filed on Aug. 31, 2020, entitled "TECHNIQUES FOR REORDERING ANTENNA ORDER TO AVOID TRANSMIT BLANKING," and assigned to the assignee hereof. The disclosure of the prior Application is considered part of and is incorporated by reference into this Patent Application

FIELD OF THE DISCLOSURE

Aspects of the present disclosure generally relate to wireless communication and to techniques and apparatuses for reordering an antenna order to avoid transmit blanking.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes identifying at least one collision between a periodic reporting of channel state information associated with a first radio access technology (RAT) and a periodic reference signal transmission associated with a second RAT, wherein each reference signal transmission of the periodic reference signal transmission is sequentially transmitted via a plurality of antennas based at least in part on a first antenna order; and determining a second antenna order for the periodic reference signal transmission that resolves the at least one collision; and transmitting the periodic reference signal transmission using the second antenna order.

In some aspects, the first antenna order uses a first order of the plurality of antennas and the second antenna order uses a second order of the plurality of antennas.

In some aspects, the periodic reporting is associated with a channel quality indicator or a rank indicator, and the periodic reference signal transmission is associated with a sounding reference signal.

In some aspects, the method includes determining that the at least one collision can be resolved by modifying the first antenna order, wherein the determination of the second antenna order is based at least in part on the determination that the at least one collision can be resolved by modifying the first antenna order.

In some aspects, the method includes determining that blanking of the periodic reporting associated with the first RAT is to be performed if the second antenna order is not used, wherein the determination of the second antenna order is based at least in part on the determination that blanking of the periodic reporting associated with the first RAT is to be performed if the second antenna order is not used.

In some aspects, the identification of the at least one collision is based at least in part on a periodicity of the periodic reference signal transmission and a periodicity of the periodic reporting being aligned with each other.

In some aspects, the identification of the at least one collision is based at least in part on a transmission of the periodic reference signal transmission on a particular antenna and a transmission of the periodic reporting on the particular antenna overlapping with each other.

In some aspects, the second antenna order is selected from a plurality of antenna orders based at least in part on the particular antenna.

In some aspects, at least one of the identification of the at least one collision or the determination of the second antenna order is based at least in part on receiving configuration information relating to the periodic reporting or the periodic reference signal transmission.

In some aspects, the second antenna order is based at least in part on a cross-switch configuration of a radio frequency chain of the UE.

In some aspects, the second antenna order includes one or more occasions in which the periodic reference signal transmission is blanked based at least in part on a duty cycle.

In some aspects, a UE for wireless communication includes a memory; and one or more processors coupled to the memory, the one or more processors configured to: identify at least one collision between a periodic reporting of channel state information associated with a first RAT and a periodic reference signal transmission associated with a second RAT, wherein each reference signal transmission of the periodic reference signal transmission is sequentially transmitted via a plurality of antennas based at least in part on a first antenna order; and determine a second antenna order for the periodic reference signal transmission that resolves the at least one collision; and transmit the periodic reference signal transmission using the second antenna order.

In some aspects, the first antenna order uses a first order of the plurality of antennas and the second antenna order uses a second order of the plurality of antennas.

In some aspects, the periodic reporting is associated with a channel quality indicator or a rank indicator, and the periodic reference signal transmission is associated with a sounding reference signal.

In some aspects, the one or more processors are further configured to: determine that the at least one collision can be resolved by modifying the first antenna order, wherein the determination of the second antenna order is based at least in part on the determination that the at least one collision can be resolved by modifying the first antenna order.

In some aspects, the one or more processors are further configured to: determine that blanking of the periodic reporting associated with the first RAT is to be performed if the second antenna order is not used, wherein the determination of the second antenna order is based at least in part on the determination that blanking of the periodic reporting associated with the first RAT is to be performed if the second antenna order is not used.

In some aspects, the identification of the at least one collision is based at least in part on a periodicity of the periodic reference signal transmission and a periodicity of the periodic reporting being aligned with each other.

In some aspects, the identification of the at least one collision is based at least in part on a transmission of the periodic reference signal transmission on a particular antenna and a transmission of the periodic reporting on the particular antenna overlapping with each other.

In some aspects, the second antenna order is selected from a plurality of antenna orders based at least in part on the particular antenna.

In some aspects, at least one of the identification of the at least one collision or the determination of the second antenna order is based at least in part on receiving configuration information relating to the periodic reporting or the periodic reference signal transmission.

In some aspects, the second antenna order is based at least in part on a cross-switch configuration of a radio frequency chain of the UE.

In some aspects, the second antenna order includes one or more occasions in which the periodic reference signal transmission is blanked based at least in part on a duty cycle.

In some aspects, a non-transitory computer-readable medium storing a set of instructions for wireless communication includes one or more instructions that, when executed by one or more processors of a UE, cause the UE to: identify at least one collision between a periodic reporting of channel state information associated with a first RAT and a periodic reference signal transmission associated with a second RAT, wherein each reference signal transmission of the periodic reference signal transmission is sequentially transmitted via a plurality of antennas based at least in part on a first antenna order; and determine a second antenna order for the periodic reference signal transmission that resolves the at least one collision; and transmit the periodic reference signal transmission using the second antenna order.

In some aspects, the first antenna order uses a first order of the plurality of antennas and the second antenna order uses a second order of the plurality of antennas.

In some aspects, the periodic reporting is associated with a channel quality indicator or a rank indicator, and the periodic reference signal transmission is associated with a sounding reference signal.

In some aspects, the one or more instructions further cause the UE to: determine that the at least one collision can be resolved by modifying the first antenna order, wherein the determination of the second antenna order is based at least in part on the determination that the at least one collision can be resolved by modifying the first antenna order.

In some aspects, the one or more instructions further cause the UE to: determine that blanking of the periodic reporting associated with the first RAT is to be performed if the second antenna order is not used, wherein the determination of the second antenna order is based at least in part on the determination that blanking of the periodic reporting associated with the first RAT is to be performed if the second antenna order is not used.

In some aspects, the identification of the at least one collision is based at least in part on a periodicity of the periodic reference signal transmission and a periodicity of the periodic reporting being aligned with each other.

In some aspects, the identification of the at least one collision is based at least in part on a transmission of the periodic reference signal transmission on a particular antenna and a transmission of the periodic reporting on the particular antenna overlapping with each other.

In some aspects, the second antenna order is selected from a plurality of antenna orders based at least in part on the particular antenna.

In some aspects, at least one of the identification of the at least one collision or the determination of the second antenna order is based at least in part on receiving configuration information relating to the periodic reporting or the periodic reference signal transmission.

In some aspects, the second antenna order is based at least in part on a cross-switch configuration of a radio frequency chain of the UE.

In some aspects, the second antenna order includes one or more occasions in which the periodic reference signal transmission is blanked based at least in part on a duty cycle.

In some aspects, an apparatus for wireless communication includes means for identifying at least one collision between a periodic reporting of channel state information associated with a first RAT and a periodic reference signal transmission associated with a second RAT, wherein each reference signal transmission of the periodic reference signal transmission is sequentially transmitted via a plurality of antennas based at least in part on a first antenna order; and means for determining a second antenna order for the periodic reference signal transmission that resolves the at least one collision; and means for transmitting the periodic reference signal transmission using the second antenna order.

In some aspects, the first antenna order uses a first order of the plurality of antennas and the second antenna order uses a second order of the plurality of antennas.

In some aspects, the periodic reporting is associated with a channel quality indicator or a rank indicator, and the periodic reference signal transmission is associated with a sounding reference signal.

In some aspects, the apparatus includes means for determining that the at least one collision can be resolved by modifying the first antenna order, wherein the determination of the second antenna order is based at least in part on the determination that the at least one collision can be resolved by modifying the first antenna order.

In some aspects, the apparatus includes means for determining that blanking of the periodic reporting associated with the first RAT is to be performed if the second antenna order is not used, wherein the determination of the second antenna order is based at least in part on the determination that blanking of the periodic reporting associated with the first RAT is to be performed if the second antenna order is not used.

In some aspects, the identification of the at least one collision is based at least in part on a periodicity of the periodic reference signal transmission and a periodicity of the periodic reporting being aligned with each other.

In some aspects, the identification of the at least one collision is based at least in part on a transmission of the periodic reference signal transmission on a particular antenna and a transmission of the periodic reporting on the particular antenna overlapping with each other.

In some aspects, the second antenna order is selected from a plurality of antenna orders based at least in part on the particular antenna.

In some aspects, at least one of the identification of the at least one collision or the determination of the second antenna order is based at least in part on receiving configuration information relating to the periodic reporting or the periodic reference signal transmission.

In some aspects, the second antenna order is based at least in part on a cross-switch configuration of a radio frequency chain of the apparatus.

In some aspects, the second antenna order includes one or more occasions in which the periodic reference signal transmission is blanked based at least in part on a duty cycle.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
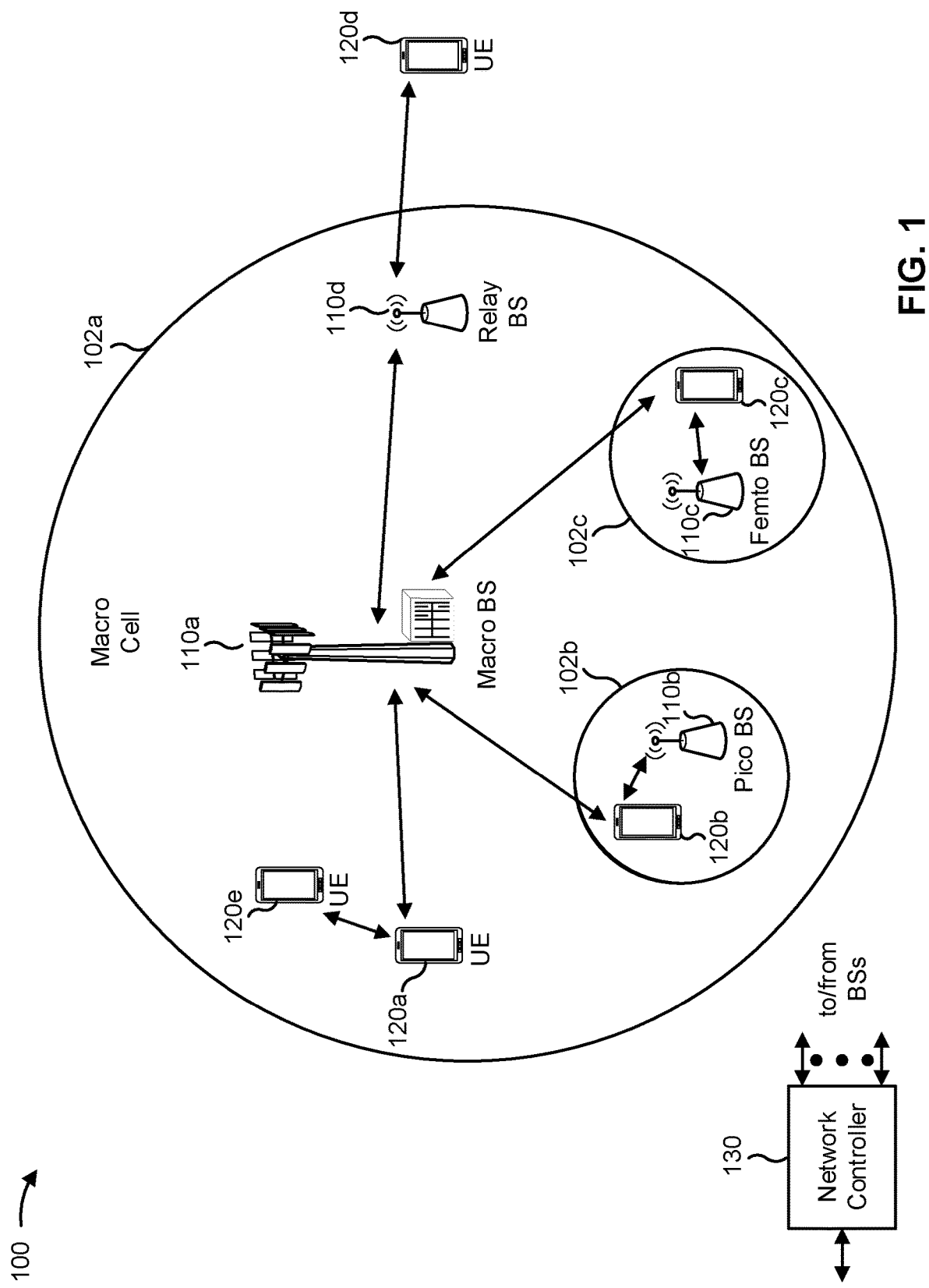
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
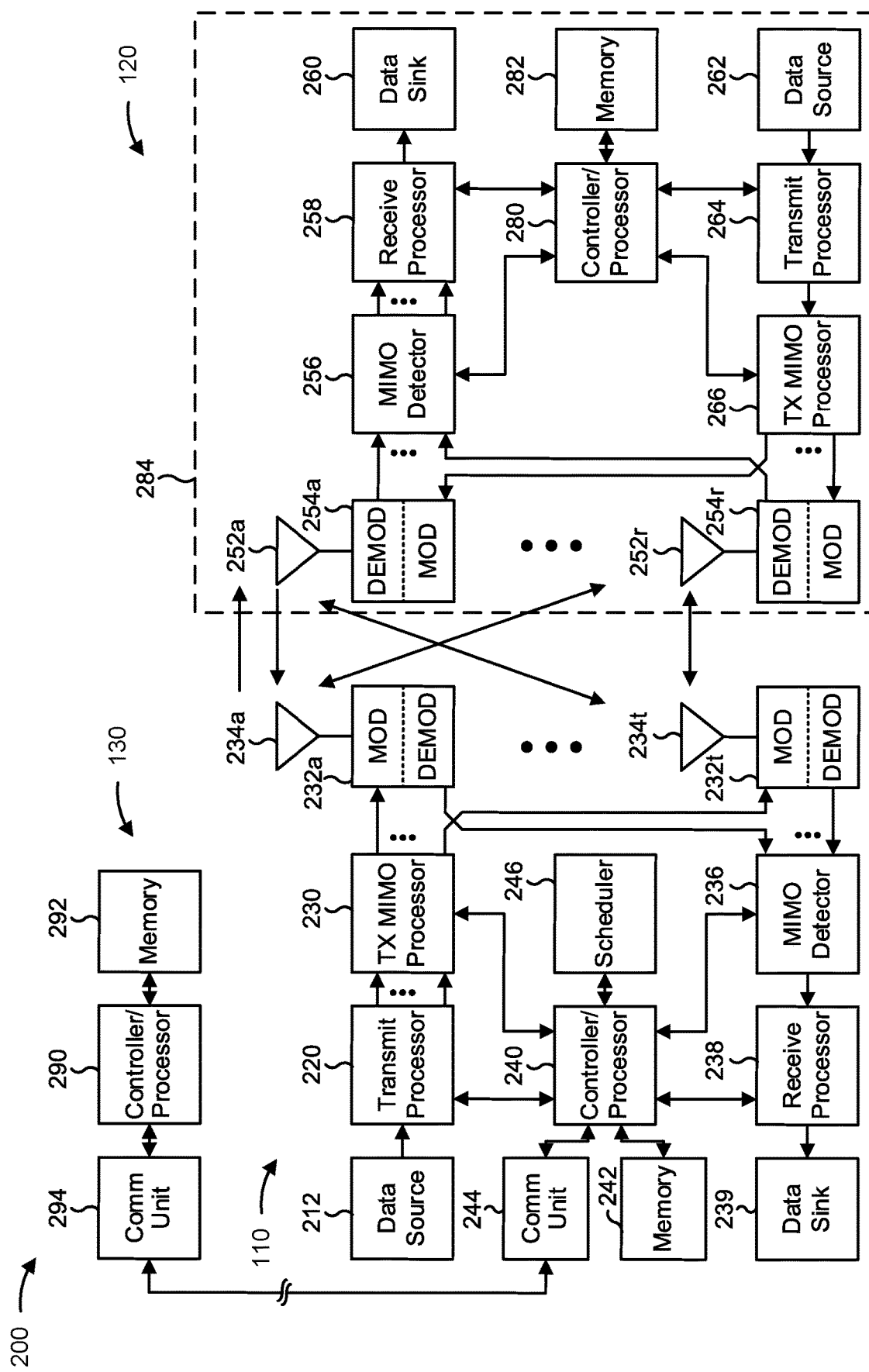
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with reordering an antenna order to avoid transmit blanking, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions.

In some aspects, the UE includes means for identifying at least one collision between a periodic reporting of channel state information associated with a first RAT and a periodic reference signal transmission associated with a second RAT, wherein each reference signal transmission of the periodic reference signal transmission is sequentially transmitted via a plurality of antennas based at least in part on a first antenna order; and/or means for determining a second antenna order for the periodic reference signal transmission that resolves the at least one collision; and/or means for transmitting the periodic reference signal transmission using the second antenna order. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for determining that the at least one collision can be resolved by modifying the first antenna order, wherein the determination of the second antenna order is based at least in part on the determination that the at least one collision can be resolved by modifying the first antenna order.

In some aspects, the UE includes means for determining that blanking of the periodic reporting associated with the first RAT is to be performed if the second antenna order is not used, wherein the determination of the second antenna order is based at least in part on the determination that blanking of the periodic reporting associated with the first RAT is to be performed if the second antenna order is not used.

As indicated above, FIG. 2 is provided as an example. Other examples may differ from what is described with regard to FIG. 2.

Figure 3:
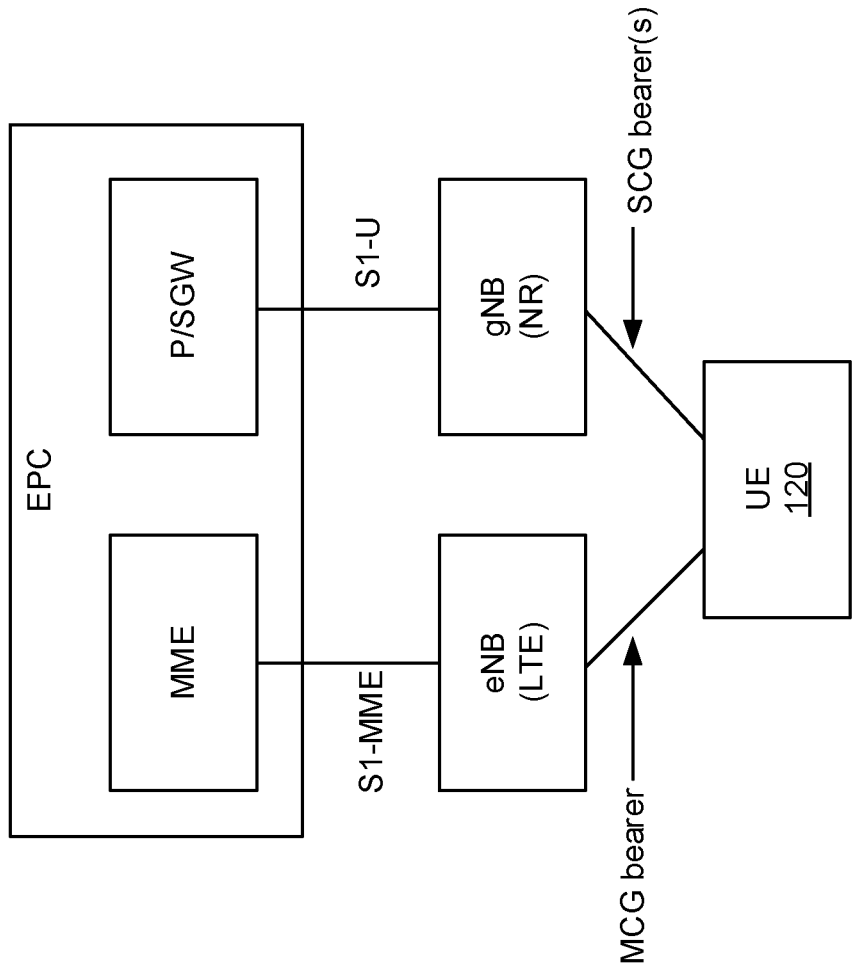
FIG. 3 is a diagram illustrating an example of dual connectivity, in accordance with the present disclosure.

FIG. 3 is a diagram illustrating an example 300 of dual connectivity, in accordance with the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT, and the SCG is associated with an NR RAT), an NR-E-UTRA dual connectivity (NEDC) mode (e.g., where the MCG is associated with an NR RAT, and the SCG is associated with an LTE RAT), an NR dual connectivity (NRDC) mode (e.g., where the MCG is associated with an NR RAT, and the SCG is also associated with the NR RAT), or another dual connectivity mode (e.g., where the MCG is associated with a first RAT, and the SCG is associated with one of the first RAT or a second RAT). The ENDC mode is sometimes referred to as an NR or 5G non-standalone (NSA) mode. Thus, as used herein, a dual connectivity mode may refer to an ENDC mode, a NEDC mode, an NRDC mode, and/or another type of dual connectivity mode.

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or the like. In FIG. 3, the PGW and the SGW are shown collectively as P/SGW. In some aspects, the eNB and the gNB may be co-located at the same base station 110. In some aspects, the eNB and the gNB may be included in different base stations 110 (i.e., may not be co-located).

As further shown in FIG. 3, in some aspects, a wireless network that permits operation in a 5G NSA mode may permit such operations using an MCG for a first RAT (e.g., an LTE RAT, a 4G RAT, and/or the like) and an SCG for a second RAT (e.g., an NR RAT, a 5G RAT, and/or the like). In this case, the UE 120 may communicate with the eNB via the MCG and may communicate with the gNB via the SCG. In some aspects, the MCG may anchor a network connection between the UE 120 and the 4G/LTE core network (e.g., for mobility, coverage, control plane information, and/or the like), and the SCG may be added as additional carriers to increase throughput (e.g., for data traffic, user plane information, and/or the like). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC). Alternatively, in some aspects, a UE 120 may be concurrently connected with one or more base stations 110 that use the same RAT (e.g., in the case of NRDC). In some aspects, the MCG may be associated with a first frequency band (e.g., a sub-6 GHz band and/or an FR1 band), and the SCG may be associated with a second frequency band (e.g., a millimeter wave band and/or an FR2 band).

The UE 120 may communicate via the MCG and the SCG using one or more radio bearers (e.g., data radio bearers (DRBs), signaling radio bearers (SRBs), and/or the like). For example, the UE 120 may transmit or receive data via the MCG and/or the SCG using one or more DRBs. Similarly, the UE 120 may transmit or receive control information (e.g., radio resource control (RRC) information, measurement reports, and/or the like) using one or more SRBs. In some aspects, a radio bearer may be dedicated to a specific cell group (e.g., a radio bearer may be an MCG bearer, an SCG bearer, and/or the like). In some aspects, a radio bearer may be an SRB. An SRB may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 3 is provided as an example. Other examples may differ from what is described with respect to FIG. 3.

Figure 4:
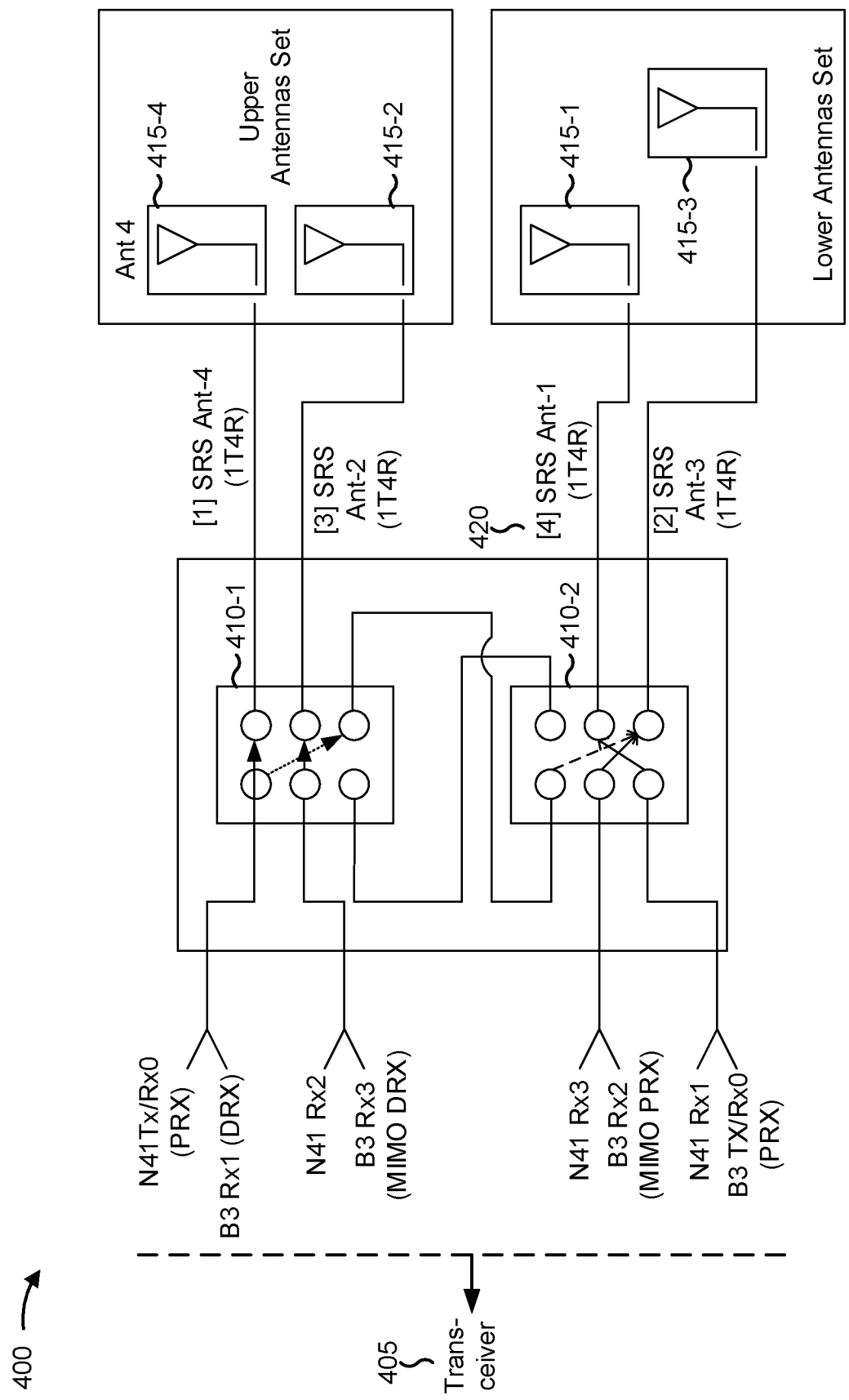
FIG. 4 is a diagram illustrating an example of a set of radio frequency (RF) chains of a UE, in accordance with the present disclosure.

FIG. 4 is a diagram illustrating an example 400 of a set of radio frequency (RF) chains of a UE, in accordance with the present disclosure. FIG. 4 shows a transceiver 405, a set of cross-switches 410-1 and 410-2, and a set of antennas 415-1 through 415-4. The set of antennas 415 are grouped into an upper antenna set, which may be situated in an upper region of the UE, and a lower antenna set, which may be situated in a lower region of the UE. Thus, antenna diversity is achieved in situations where one of the upper region or the lower region of the UE may be impeded, for example, by a user's hand or other blockage.

A cross-switch 410 may provide for an input signal to be switched from one antenna 415 to another antenna 415, or for a signal received from an antenna 415 to be switched from one receive path to another receive path. A cross-switch 410 may be a hardware component (e.g., a physical switch) or may be implemented in the baseband via precoding and/or the like. A cross-switch configuration may indicate how signals are mapped to antennas by a cross-switch 410. In some aspects, a cross-switch 410 may implement an antenna switching configuration, such as an antenna switching diversity configuration, which may improve antenna diversity of transmissions of the UE.

An antenna 415 may be antenna 252 and/or the like. An antenna 415 can perform reception, transmission, or a combination thereof. For example, a RAT may be associated with one or more receive antennas and one or more transmit antennas. In example 400, there are two RATs: an LTE RAT associated with band B3, and an NR RAT associated with band N41. For example, the UE of example 400 may be associated with an ENDC configuration, wherein the LTE RAT is associated with a primary cell (PCell) and the NR RAT is associated with a primary secondary cell (PSCell). The NR RAT and the LTE RAT may both be associated with 4 receive antennas and 1 transmit antenna, which is denoted by 1T4R. Furthermore, each of the NR RAT and the LTE RAT may be associated with a primary receive (PRX) antenna.

Some transmissions may be performed using an antenna order. An antenna order may define an order in which antennas 415 are to be sequentially used to perform a transmission. As an example, a sounding reference signal (SRS) may be transmitted using an antenna order in order to improve transmit diversity. An SRS is a signal used to sound parts of the spectrum that are not in use by an allocated resource block, in order for a base station to estimate channel quality. In the course of transmitting the SRS using the antenna order, the UE may switch an antenna used for a current physical uplink shared channel (PUSCH) to a different antenna used for reception in a current operating frequency channel (e.g., associated with an absolute radio-frequency channel number (ARFCN)). The base station may use the SRS for improve downlink precoding, thereby improving downlink MIMO performance. As an example of an antenna order, the SRS may be transmitted on antennas 415-4, 415-3, 415-2, and 415-1 in order, which may be represented by (4,3,2,1). In FIG. 4, the SRS antenna order is represented by the numbers in brackets (for example, the [4] shown by reference number 420 indicates that antenna 415-1 is a fourth antenna in the antenna order). The SRS transmission may be performed periodically (e.g., in accordance with a periodicity).

The UE of example 400 may share RF front end (RFFE) resources (e.g., cross-switch 410, antenna 415, and/or the like) between the LTE RAT and the NR RAT. In some circumstances, a communication associated with a first RAT (e.g., the NR RAT) may utilize RFFE resources that would otherwise be used for a concurrent communication associated with a second RAT (e.g., the LTE RAT). This is referred to as a collision of the communication associated with the first RAT and the communication associated with the second RAT. In example 400, the transmission of the SRS on antenna 1 may collide with an LTE transmission on antenna 1, as shown by reference number 420. For example, the cross-switch 410-2 may route the B3 Tx (labeled as B3 TX/RX0 (PRX)) to the antenna 415-1, which is concurrently used for SRS transmission. Furthermore, in some scenarios, an uplink transmission on the second RAT (e.g., a CQI, a rank indicator (RI), and/or the like) may be periodic and may repeatedly collide with an uplink transmission on the first RAT. For example, if the uplink transmission on the first RAT is an SRS associated with an antenna order, the uplink transmission on the second RAT may repeatedly collide with the SRS transmission on a particular antenna based at least in part on the antenna order. Persistent collisions may impact throughput and radio link quality on the second RAT.

In such a scenario, the UE may drop the communication associated with the second RAT (which is referred to herein as blanking a communication associated with the second RAT). However, blanking the communication associated with the second RAT negatively impacts block error rate (BLER) on the connection associated with the second RAT, which could lead to diminished throughput and radio link failure (RLF). RLF of an LTE connection for an ENDC UE may be particularly problematic since the LTE connection is associated with the PCell.

Some techniques and apparatuses described herein provide for an antenna order of a periodic reference signal transmission to be modified based at least in part on identifying one or more collisions between the periodic reference signal transmission and a periodic transmission (e.g., a control channel transmission, a periodic reporting of channel state information, an idle mode reception operation, and/or the like). For example, the UE may identify at least one collision between the periodic reference signal transmission and the periodic transmission and may modify the antenna order of the periodic reference signal transmission based at least in part on the at least one collision. The modified antenna order may be configured such that the at least one collision is eliminated, or so that a frequency of collisions between the periodic reference signal transmission and the periodic transmission is reduced. For example, for an antenna order of [4 3 2 1] for transmission of an SRS, where a collision occurs on antenna 1, the antenna order may be modified to (for example) [4 3 1 2], so that the SRS transmission on antenna 1 is transmitted at a different time than the colliding collision.

In this way, an impact of collisions between periodic communications, such as collisions between NR SRS transmissions and LTE channel state information (CSI) transmissions or idle mode reception operations, is reduced. Thus, throughput is improved and impact on the communication link is mitigated.

As indicated above, FIG. 4 is provided as an example. Other examples may differ from what is described with regard to FIG. 4.

Figure 5:
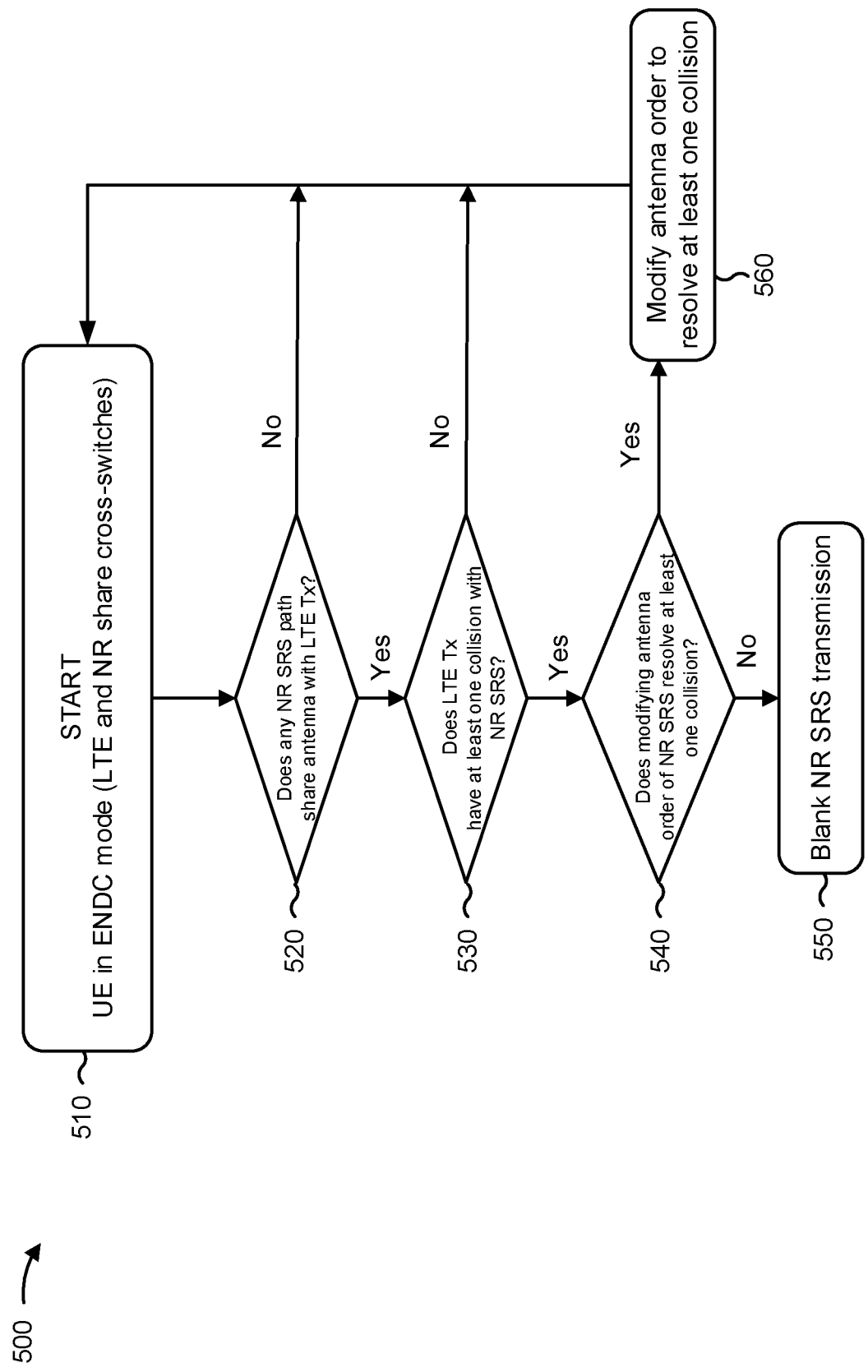
FIG. 5 is a diagram illustrating an example of identifying and mitigating a collision based at least in part on an antenna order for a reference signal transmission, in accordance with the present disclosure.

FIG. 5 is a diagram illustrating an example 500 of identifying and mitigating a collision based at least in part on an antenna order for a reference signal transmission, in accordance with the present disclosure. The operations described with regard to FIG. 5 may be performed by a UE (e.g., UE 120, the UE of example 400). For example, as shown by block 510, the UE may be in an ENDC mode, wherein an LTE connection and an NR connection share cross-switches, as described in more detail in connection with FIG. 4.

As shown by block 520, the UE may determine whether any NR SRS path shares an antenna with an LTE transmission. The LTE transmission may be referred to herein as a periodic reporting of CSI, a CSI transmission, or a CQI/RI transmission, among other examples. For example, the UE may determine whether any antenna of the UE is shared between an NR connection and an LTE connection. As an example, antenna 415-1 of FIG. 4 is shared between the LTE transmission and the NR SRS transmission. An NR SRS path refers to a transmit path used for an NR SRS. For example, an SRS transmitted using the antenna order [4 3 2 1] of FIG. 4 may be associated with NR SRS paths on each of antennas 415-1 through 415-4. In some aspects, the UE may determine whether any NR SRS path collides with an LTE Tx antenna at every LTE/NR configuration or reconfiguration, or at every LTE/NR antenna switching configuration. If no NR SRS path shares an antenna with an LTE transmission (block 520—No), the UE may return to a start of example 500, at block 510.

If an NR SRS path shares an antenna with an LTE transmission (block 520—Yes), the UE may determine whether the LTE transmission is associated with a persistent collision with the NR SRS (block 530). For example, the UE may identify one or more collisions between the LTE transmission and the NR SRS. In some aspects, the UE may determine whether an LTE CQI or RI transmit antenna is associated with a persistent collision with an NR SRS path at every LTE/NR configuration or reconfiguration or LTE/NR antenna switching configuration.

In some aspects, the UE may determine if a periodicity of an LTE transmission (e.g., a CQI/RI transmission) modulo a periodicity of an NR transmission (e.g., an SRS transmission) is zero with regard to a common time reference. For example, the UE may determine if the periodicity of the periodic reference signal transmission and the periodicity of the periodic reporting are aligned with each other. For example, if the LTE transmission's periodicity is 40 ms and the NR transmission's periodicity is 20 ms, only the SRS transmission on the SRS path that is colliding with the LTE transmission's Tx antenna needs to be suspended, whereby the periodicity to suspend corresponds to the LTE transmission's periodicity (e.g., 40 ms). If the LTE transmission's periodicity is smaller than the NR transmission's periodicity, then from LTE transmission's perspective, the SRS cannot collide persistently.

In some aspects, the UE may account for pre-subframe or post-subframe procedures associated with the LTE transmission. For example, the UE, when identifying the at least one collision, may use an LTE subframe plus some amount of time before and/or after the subframe, to account for pre-subframe or post-subframe activities. In some aspects, the UE may determine a length of the NR transmission in terms of symbols (e.g., 1 symbol, 2 symbols, 4 symbols, and/or the like).

In some aspects, different LTE transmissions may have different periodicities. For example, a CQI may be associated with a different periodicity than an RI. In this case, if either periodicity has a persistent collision, the UE may identify at least one collision (e.g., may determine that a criterion for identifying a persistent collision associated with an LTE transmit antenna is satisfied).

In some aspects, the UE may determine whether at least one collision is detected based at least in part on information received from an LTE protocol stack and an NR protocol stack of the UE. For example, the UE may acquire, from the LTE protocol stack and/or the NR protocol stack, information indicating a configuration for an LTE transmission (e.g., a CSI configuration) and an NR transmission (e.g., an SRS configuration).

In some aspects, the UE may determine whether blanking of the LTE transmission or the NR SRS transmission is to be performed. For example, a UE may be associated with a sufficient number of antennas to perform both the LTE transmission and the NR SRS transmission (e.g., 5 antennas, 6 antennas, and/or the like). In such a case, if the UE is associated with a sufficient number of antennas to perform both the LTE transmission and the NR SRS transmission, the UE may determine that the LTE transmission needs not be blanked and the SRS transmission's antenna order needs not be modified, thereby conserving resources that would otherwise be used to modify the antenna order of the NR SRS transmission or blank at least one of the NR SRS transmission or the LTE transmission.

If the LTE transmission is not associated with a persistent collision with the NR SRS (block 530—No) then the UE may return to block 510. If the LTE transmission is associated with a persistent collision with the NR SRS (block 530—Yes), then the UE may determine whether modifying an antenna order of the NR SRS resolves the at least one collision. For example, the UE may determine whether swapping an order of the NR SRS transmission on the SRS path resolves the persistent collision with the LTE transmission (e.g., the LTE CSI transmission). If modifying the antenna order of the NR SRS does not resolve the at least one collision (block 540—No), then the UE may blank the NR SRS transmission (block 550). For example, the UE may blank the NR SRS transmission on a time occasion in which the NR SRS transmission collides with the LTE transmission. In some aspects, the UE may blank one or more SRS transmission instances that overlap with any portion of the LTE transmission.

If modifying the antenna order of the NR SRS resolves the at least one collision (block 540—Yes), then the UE may modify the antenna order of the NR SRS (block 560), and may return to block 510. For example, the UE may determine a second antenna order that is different than a first antenna order for the NR SRS transmission. The second antenna order may be configured such that the NR SRS does not collide with the LTE transmission. In this way, an impact of periodic SRS transmission on LTE transmissions is reduced, thereby improving throughput and BLER of the LTE connection and reducing BLER on the LTE connection.

The below pseudocode illustrates an example process relating to example 500. In the below pseudocode, /* and */ delimit code comments. For example, /* ABC */ is a code comment of "ABC." Lines of pseudocode are numbered sequentially.

In the above pseudocode, the UE determines a default SRS transmission antenna order of (1,2,3,4). The UE also generates non-default SRS transmission antenna orders of (1,2,4,3), (1,4,3,2), (1,4,2,3), (1,3,2,4), and (1,3,4,2). If the UE identifies a colliding antenna, for item-X, is antenna 4 (i.e., the last antenna of the default SRS transmission order), then the UE may select, from the non-default SRS transmission antenna orders, a set of antenna orders in which antenna 4 is in a different position in the default SRS antenna order. In this example, the UE may select one of (1,2,4,3), (1,4,3,2), (1,4,2,3), and (1,3,4,2). The UE may set the SRS transmission's antenna order to the selected non-default SRS antenna order.

In the above pseudocode, the determination of whether to suspend SRS antenna switching for a corresponding colliding time occurrence is based at least in part on a duty cycle associated with a configurable value Y. Example values of 1, 2, 4, 8, and 16 are provided for Y. Example actions corresponding to the values of Y are provided below:

If Y==1, then blank/suspend NR SRS alt-path antenna that is colliding persistently with LTE PUCCH CQI/RI for all colliding time instance If Y==2, then blank/suspend NR SRS alt-path antenna that is colliding persistently with LTE PUCCH CQI/RI for 1 out of 2 colliding instance If Y==4, then blank/suspend NR SRS alt-path antenna that is colliding persistently with LTE PUCCH CQI/RI for 1 out of 4 colliding instance

```
1 /*Obtain default SRS transmission antenna sequence (1,2,3,4) with SRS
transmission antenna (1) the default antenna that cannot be changed in a current
configuration sequence, default SRS config based on ENDC band combo and
RF front-end HW*/
2 /* Default SRS alt-path antenna: antenna-2, antenna-3, antenna-4 */
3 /* generate non-default SRS transmission antenna sequence set-B: {(1,2,4,3),
(1,4,3,2), (1,4,2,3) , (1,3,2,4), (1,3,4,2)} */
4 /* each SRS transmission sequence has a known configured transmission
duration wrt NR symbol duration and known start/end of transmission sequence
referenced to a common time reference */
5 FOR each LTE physical uplink control channel (PUCCH) CQI/RI periodic
reporting item /* check for persistent collision */
6     SET current periodic reporting item as item-X /* item-X range is from 1
to N where N is number of periodic configured items on PUCCH*/
7     IF LTE PUCCH periodic reporting item-X collides persistently with NR
SRS default sequence
8             Determine colliding default SRS alt-path antenna for
             item-X
9             Determine non-colliding SRS antenna sequences set for
             item-X from non-default SRS transmission sequence set B
10            Proceed to check next LTE PUCCH periodic reporting
             item for persistent collision /* go to next LTE PUCCH periodic
             reporting    item persistent collision check */
11    END
12 END
13 FOR each LTE PUCCH CQI/RI periodic reporting item with persistent
collision
14    IF common non-colliding SRS antenna sequence set across all periodic
reporting item > 1
15            SET SRS antenna sequence set to non-colliding SRS antenna
             sequence set with minimum LTE Rx blanking antennas
16    ELSEIF common non-colliding SRS antenna sequence set across all
periodic reporting item ==1
17            SET SRS antenna sequence set to non-colliding SRS antenna
             sequence set
18    ELSE
19            SUSPEND SRS antenna switching for corresponding colliding
             time occurrence /* suspend with regard to default SRS sequence */
20            /* suspend SRS is based on EFS configurable item (Y) for the
             case we want to blank/suspend SRS. Y possible values are (1,2,4,8,16).
             */
21    END
22 END
```

If Y==8, then blank/suspend NR SRS alt-path antenna that is colliding persistently with LTE PUCCH CQI/RI for 1 out of 8 colliding instance If Y==16, then blank/suspend NR SRS alt-path antenna that is colliding persistently with LTE PUCCH CQI/RI for 1 out of 16 colliding instance Thus, the NR SRS is blanked every Y colliding instances. In some aspects, an antenna order of the UE indicate the colliding instances that are to be blanked. In some aspects, the UE may determine the colliding instances to be blanked independently of the antenna order.

In some aspects, the UE may receive configuration information (e.g., RRC reconfiguration information for the LTE RAT or the NR RAT) that modifies the periodicity of the SRS transmission or the LTE transmission. The UE may start from block 510 based at least in part on receiving such information. For example, the UE (e.g., a software module of the UE) may be notified if there is an LTE or NR reconfiguration that impacts the LTE connection's CQI/RI periodicity or the NR connection's SRS periodicity.

As indicated above, FIG. 5 is provided as an example. Other examples may differ from what is described with regard to FIG. 5.

Figure 6:
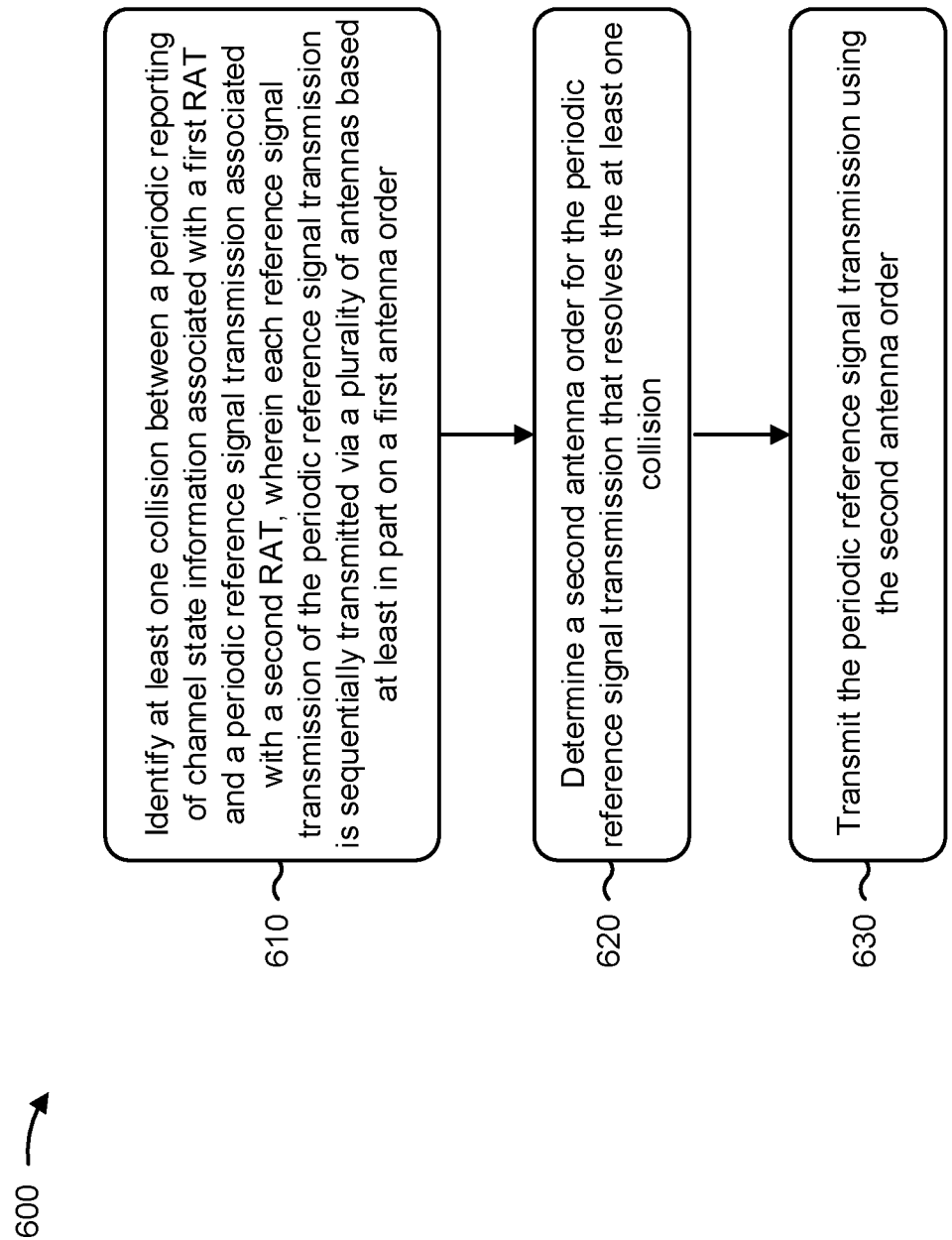
FIG. 6 is a diagram illustrating an example process associated with identifying and mitigating a collision based at least in part on an antenna order for a reference signal transmission, in accordance with the present disclosure.

FIG. 6 is a diagram illustrating an example process 600 performed, for example, by a UE, in accordance with the present disclosure. Example process 600 is an example where the UE (e.g., UE 120) performs operations associated with reordering an antenna order to avoid transmit blanking.

As shown in FIG. 6, in some aspects, process 600 may include identifying at least one collision between a periodic reporting of channel state information associated with a first RAT and a periodic reference signal transmission associated with a second RAT, wherein each reference signal transmission of the periodic reference signal transmission is sequentially transmitted via a plurality of antennas based at least in part on a first antenna order (block 610). For example, the UE (e.g., using identification component 708, depicted in FIG. 7) may identify at least one collision between a periodic reporting of channel state information associated with a first RAT and a periodic reference signal transmission associated with a second RAT, wherein each reference signal transmission of the periodic reference signal transmission is sequentially transmitted via a plurality of antennas based at least in part on a first antenna order, as described above.

As further shown in FIG. 6, in some aspects, process 600 may include determining a second antenna order for the periodic reference signal transmission that resolves the at least one collision (block 620). For example, the UE (e.g., using determination component 710, depicted in FIG. 7) may determine a second antenna order for the periodic reference signal transmission that resolves the at least one collision, as described above. In some aspects, "resolving the at least one collision" may include partially resolving the at least one collision. For example, the second antenna order may minimize the number of remaining collisions relative to one or more other potential antenna orders. As another example, the second antenna order may resolve the at least one collision, though other collisions may remain. As used herein, "resolving a collision" refers to eliminating the need to drop one of the periodic reference signal transmission or the periodic reporting at a time associated with the at least one collision. In some aspects, the at least one collision is a persistent collision, where a persistent collision is based at least in part on respective periodicities of the periodic reference signal transmission and the periodic reporting causing the two communications to overlap on a repeated basis.

As further shown in FIG. 6, in some aspects, process 600 may include transmitting the periodic reference signal transmission using the second antenna order (block 630). For example, the UE (e.g., using transmission component 704, depicted in FIG. 7) may transmit the periodic reference signal transmission using the second antenna order, as described above.

Process 600 may include additional aspects, such as any single aspect or any combination of aspects described below and/or in connection with one or more other processes described elsewhere herein.

In a first aspect, the first antenna order uses a first order of the plurality of antennas and the second antenna order uses a second order of the plurality of antennas.

In a second aspect, alone or in combination with the first aspect, the periodic reporting is associated with a channel quality indicator or a rank indicator, and wherein the periodic reference signal transmission is associated with a sounding reference signal.

In a third aspect, alone or in combination with one or more of the first and second aspects, process 600 includes determining that the at least one collision can be resolved by modifying the first antenna order, wherein the determination of the second antenna order is based at least in part on the determination that the at least one collision can be resolved by modifying the first antenna order.

In a fourth aspect, alone or in combination with one or more of the first through third aspects, process 600 includes determining that blanking of the periodic reporting associated with the first RAT is to be performed if the second antenna order is not used, wherein the determination of the second antenna order is based at least in part on the determination that blanking of the periodic reporting associated with the first RAT is to be performed if the second antenna order is not used.

In a fifth aspect, alone or in combination with one or more of the first through fourth aspects, the identification of the at least one collision is based at least in part on a periodicity of the periodic reference signal transmission and a periodicity of the periodic reporting being aligned with each other.

In a sixth aspect, alone or in combination with one or more of the first through fifth aspects, the identification of the at least one collision is based at least in part on a transmission of the periodic reference signal transmission on a particular antenna and a transmission of the periodic reporting on the particular antenna overlapping with each other.

In a seventh aspect, alone or in combination with one or more of the first through sixth aspects, the second antenna order is selected from a plurality of antenna orders based at least in part on the particular antenna.

In an eighth aspect, alone or in combination with one or more of the first through seventh aspects, at least one of the identification of the at least one collision or the determination of the second antenna order is based at least in part on receiving configuration information relating to the periodic reporting or the periodic reference signal transmission.

In a ninth aspect, alone or in combination with one or more of the first through eighth aspects, the second antenna order is based at least in part on a cross-switch configuration of a radio frequency chain of the UE.

In a tenth aspect, alone or in combination with one or more of the first through ninth aspects, the second antenna order includes one or more occasions in which the periodic reference signal transmission is blanked based at least in part on a duty cycle.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
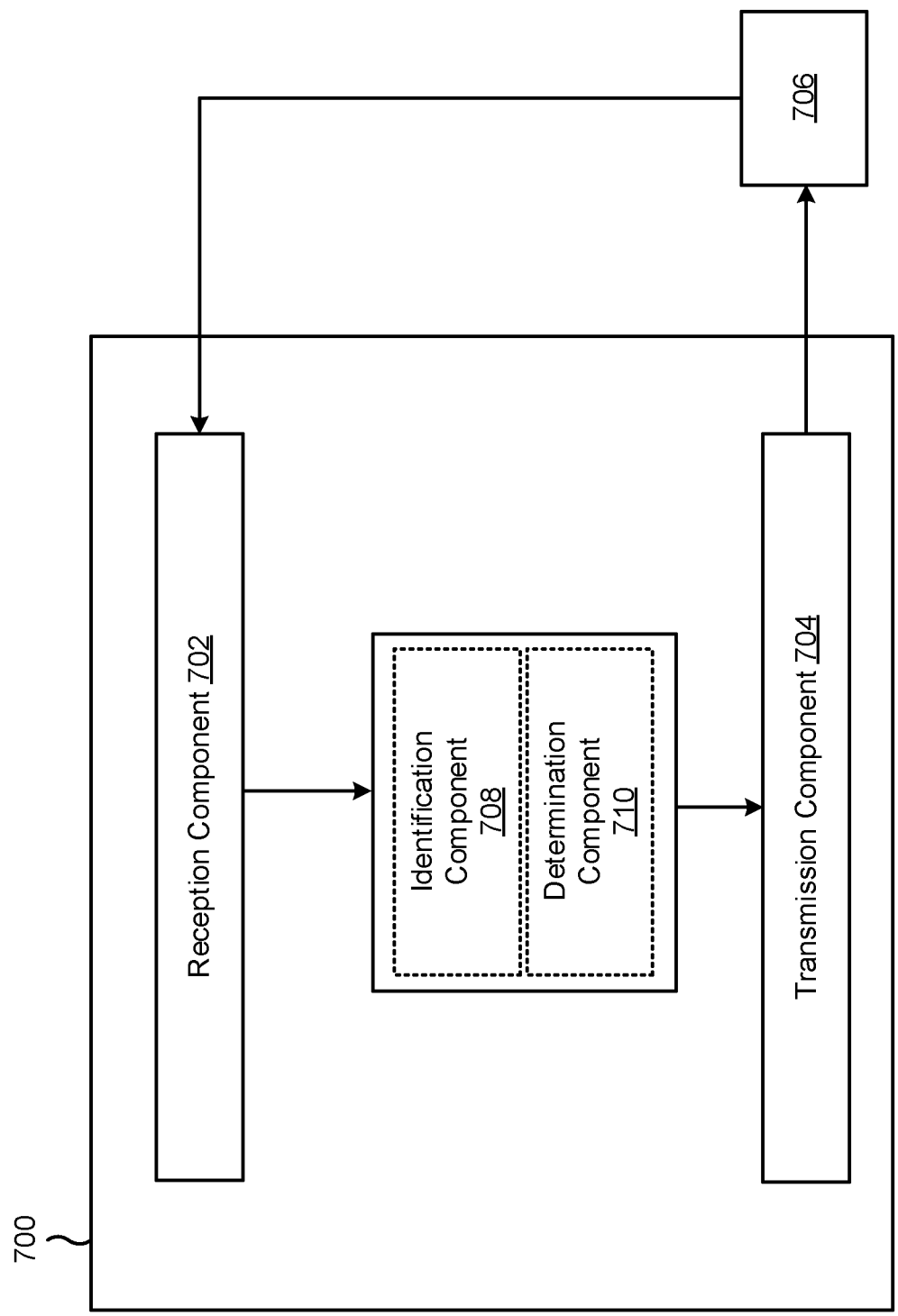
FIG. 7 is a block diagram of an example apparatus for wireless communication, in accordance with the present disclosure.

FIG. 7 is a block diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of an identification component 708, a determination component 710, among other examples.

In some aspects, the apparatus 700 may be configured to perform one or more operations described herein in connection with FIGS. 3-5. Additionally or alternatively, the apparatus 700 may be configured to perform one or more processes described herein, such as process 600 of FIG. 6. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be collocated with the reception component 702 in a transceiver.

The identification component 708 may identify at least one collision between a periodic reporting of channel state information associated with a first RAT and a periodic reference signal transmission associated with a second RAT, wherein each reference signal transmission of the periodic reference signal transmission is sequentially transmitted via a plurality of antennas based at least in part on a first antenna order. In some aspects, the identification component 708 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The determination component 710 may determine a second antenna order for the periodic reference signal transmission that resolves the at least one collision. In some aspects, the determination component 710 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 704 may transmit the periodic reference signal transmission using the second antenna order.

The determination component 710 may determine that the at least one collision can be resolved by modifying the first antenna order, wherein the determination of the second antenna order is based at least in part on the determination that the at least one collision can be resolved by modifying the first antenna order.

The determination component 710 may determine that blanking of the periodic reporting associated with the first RAT is to be performed if the second antenna order is not used, wherein the determination of the second antenna order is based at least in part on the determination that blanking of the periodic reporting associated with the first RAT is to be performed if the second antenna order is not used. In some aspects, the determination component 710 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
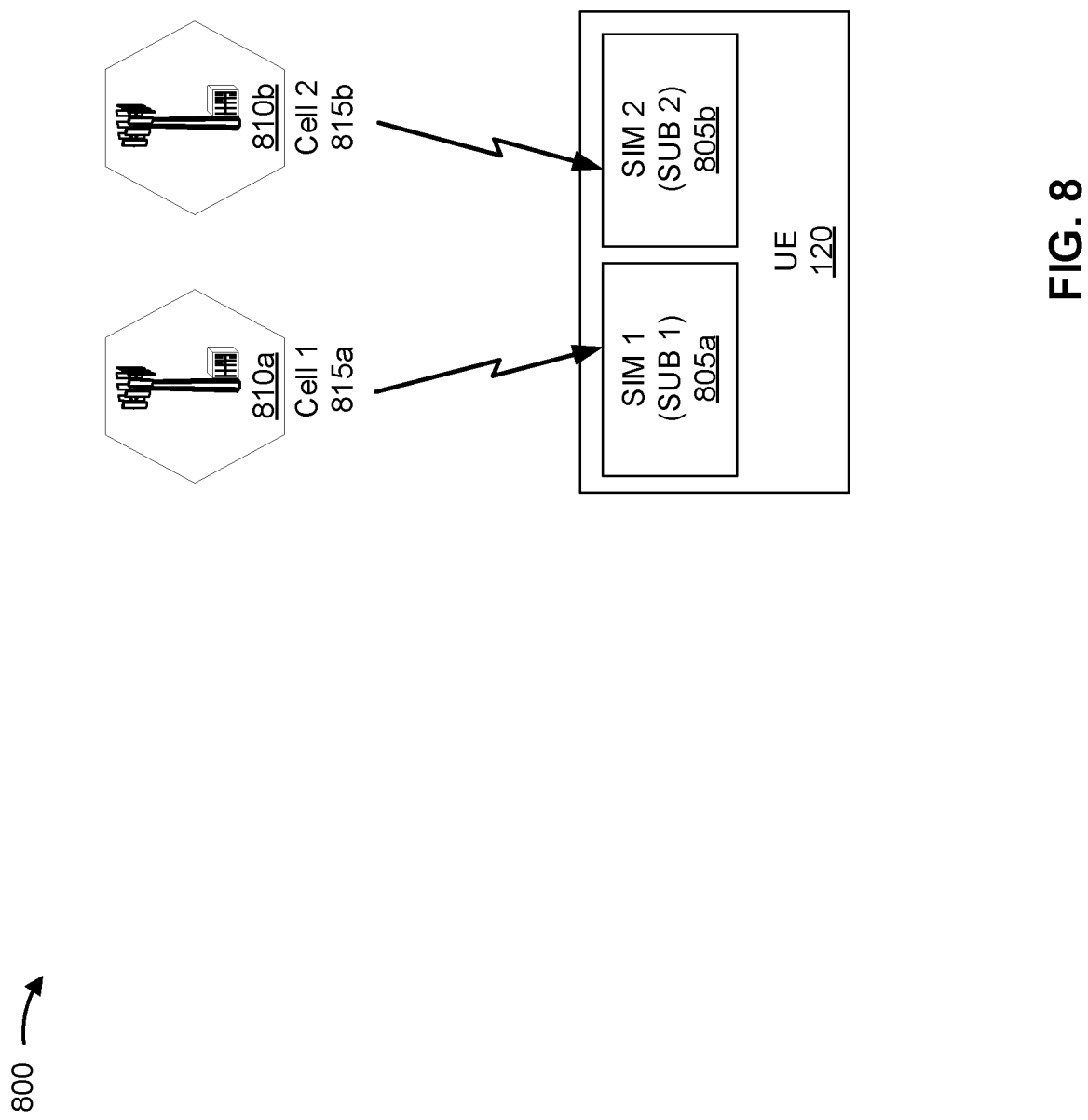
FIG. 8 is a diagram illustrating an example of a multi-subscriber identity module (SIM) UE, in accordance with the present disclosure.

FIG. 8 is a diagram illustrating an example 800 of a multi-subscriber identity module (SIM) UE, in accordance with the present disclosure. As shown in FIG. 8, a UE 120 may be a multiple SIM (multi-SIM) UE that includes multiple SIMS (two or more SIMs), shown as a first SIM 805a and a second SIM 805b. The first SIM 805a may be associated with a first subscription (shown as SUB 1, and also referred to as a first subscription), and the second SIM 805b may be associated with a second subscription (shown as SUB 2, and also referred to as a second subscription). A subscription may be a subscription with a network operator (for example, a mobile network operator (MNO)) that enables the UE 120 to access a wireless network (for example, a radio access network (RAN)) associated with the network operator.

A SIM 805 may be a removable SIM (for example, a SIM card) or an embedded SIM. A SIM 805 may include an integrated circuit that securely stores an international mobile subscriber identity (IMSI) and a security key, which are used to identify and authenticate a corresponding subscription associated with the SIM 805. In some cases, a SIM 805 may store a list of services that the UE 120 has permission to access using a subscription associated with the SIM 805, such as a data service or a voice service, among other examples.

As further shown in FIG. 8, the UE 120 may communicate (for example, in a connected mode, an idle mode, or an inactive mode) with a first base station 810a via a first cell 815a (shown as Cell 1) using the first SIM 805a. In this case, a first subscription (SUB 1) of the UE 120 may be used to access the first cell 815a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 810b via a second cell 815b (shown as Cell 2) using the second SIM 805b. In this case, a second subscription (SUB 2) of the UE 120 may be used to access the second cell 815b (for example, using a second IMSI for UE identification, using a second security key for UE authentication, using a second list of services that the UE 120 is permitted to access using the second subscription, or by counting data or voice usage on the second cell against the second subscription, among other examples).

The first base station 810a and/or the second base station 810b may include one or more of the base stations 110 described above in connection with FIG. 1. Although the first cell 815a and the second cell 815b are shown as being provided by different base stations, in some aspects, the first cell 815 and the second cell 815b may be provided by the same base station. Thus, in some aspects, the first base station 810a and the second base station 810b may be integrated into a single base station.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a multi-SIM multiple active (SR-MSMA) mode, such as a dual SIM dual active (DSDA) mode (e.g., when the UE 120 is associated with two subscriptions).

In a DSDA mode, the UE 120 is capable of concurrent active communication using both SIMS of the UE 120. Thus, a UE 120 in the DSDA mode is capable of communicating using the first SIM 305a (and the first subscription) at the same time as communicating using the second SIM 305b (and the second subscription). For example, when the UE 120 is in an active session (e.g., a voice call or another latency sensitive service, such as online gaming, stock trading, or an over-the-top (OTT) service) using the first SIM 305a, the UE 120 is capable of receiving a notification of a voice call using the second SIM 305b without interrupting communications that use the first SIM 305a, and without tuning or switching away from the first cell 315a to tune to the second cell 315b.

In a DSDS mode, the UE 120 is not capable of concurrent active communication using both SIMS of the UE 120. Thus, a UE 120 in the DSDS mode is not capable of communicating using the first SIM 305a (and the first subscription) at the same time as communicating using the second SIM 305b (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some aspects, a UE 120 may be capable of using a dual-receive DSDS (DR-DSDS) mode. In the DR-DSDS mode, the UE 120 can receive communications simultaneously for two subscribers. The first subscription may be a designated data subscriber (DDS) and may be in a connected mode. The second subscription may not be a DDS (referred to herein as an nDDS), and may be in an idle mode. The UE 120 (e.g., the first subscription) may transmit reference signaling on a first RAT associated with an antenna order (as described in connection with FIG. 8). For example, the first subscription may perform 1T4R antenna switching, as described elsewhere herein. The second subscription, which may be in an idle mode, may perform periodic operations such as monitoring paging, measurement, receiving system information, or the like. Situations may arise where, due to RFFE hardware cross-switch sharing, the first subscription's transmission of reference signaling using antenna switching can negatively impact (e.g., collide with) the periodic operations of the second subscription. Techniques described herein provide resolution of such a negative impact, as described in more detail below.

In some examples, a UE 120 may be capable of operating in a DSDA mode for a first combination of RATs, and may not be capable of operating in a DSDA mode for a second combination of RATs. For example, the UE 120 may be capable of operating in a DSDA mode for NR+NR, where the first cell 315a (as well as the first SIM 305a and the first subscription) uses an NR RAT and the second cell 315b (as well as the second SIM 305b and the second subscription) also uses the NR RAT. However, the UE 120 may not be capable of operating in a DSDA mode for NR+LTE, where one of the first cell 315a (as well as the first SIM 305a and the first subscription) uses an NR RAT and the second cell 315b (as well as the second SIM 305b and the second subscription) uses an LTE RAT (or vice versa). In some aspects, the UE 120 may not be capable of operating in the DSDA mode for the second combination of RATs (e.g., NR+LTE), but be capable of operating in a DSDS mode for the second combination of RATs. This UE design reduces design costs as compared to enabling the UE 120 to operate using the DSDA mode for the second combination of RATs.

As indicated above, FIG. 8 is provided as an example. Other examples may differ from what is described with regard to FIG. 8.

Figure 9:
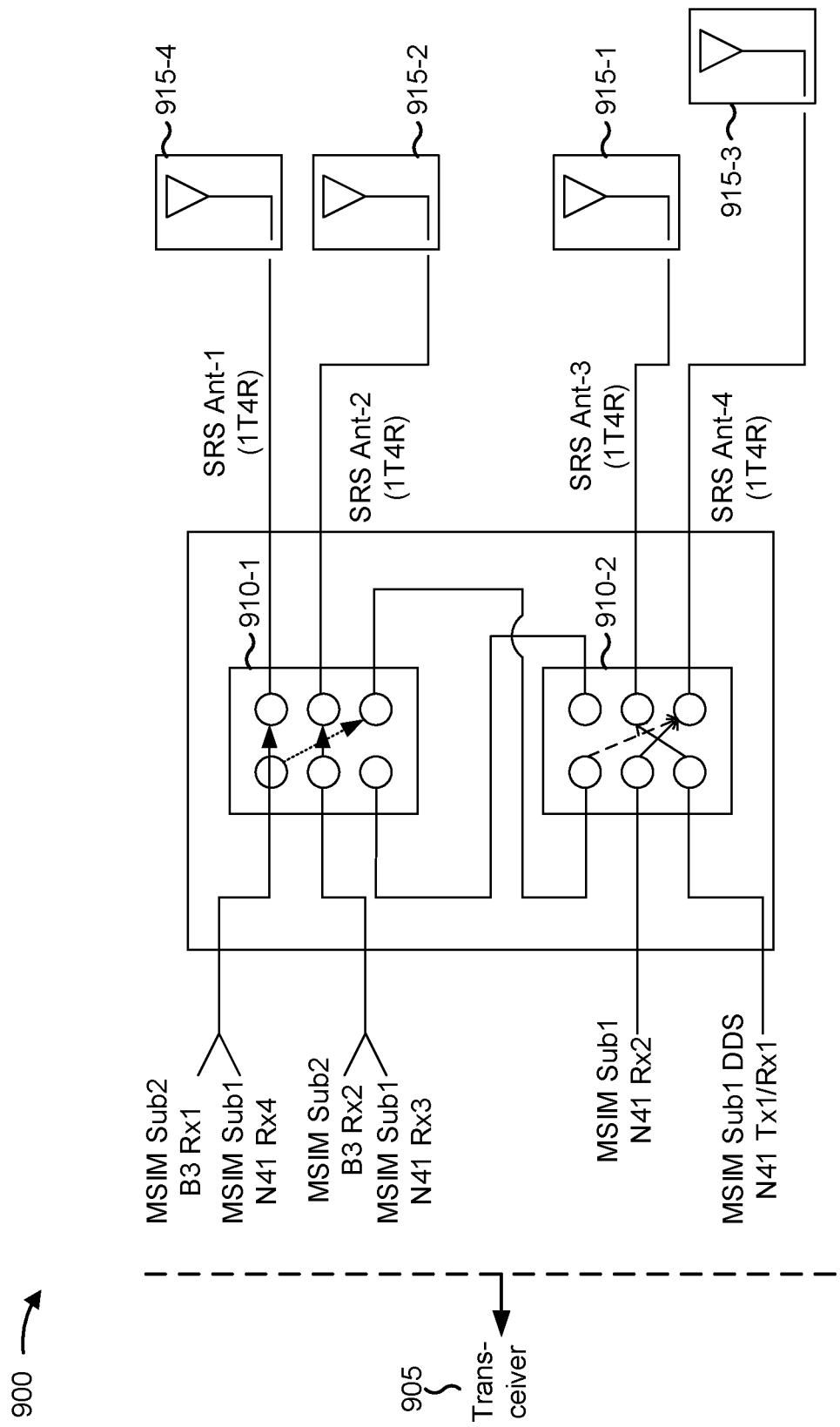
FIG. 9 is a diagram illustrating an example of a set of RF chains of a UE, in accordance with the present disclosure.

FIG. 9 is a diagram illustrating an example 900 of a set of RF chains of a UE, in accordance with the present disclosure. FIG. 9 shows a transceiver 905 (e.g., transceiver 405), a set of cross-switches 910-1 and 910-2 (e.g., cross-switches 410-1 and 410-2), and a set of antennas 915-1 through 915-4 (e.g., antennas 415-1 through 415-4).

A cross-switch 910 may provide for an input signal to be switched from one antenna 915 to another antenna 915, or for a signal received from an antenna 915 to be switched from one receive path to another receive path. A cross-switch 910 may be a hardware component (e.g., a physical switch) or may be implemented in the baseband via precoding and/or the like. A cross-switch configuration may indicate how signals are mapped to antennas by a cross-switch 910. In some aspects, a cross-switch 910 may implement an antenna switching configuration, such as an antenna switching diversity configuration, which may improve antenna diversity of transmissions of the UE.

An antenna 915 may be antenna 252 and/or the like. An antenna 915 can perform reception, transmission, or a combination thereof. For example, a RAT may be associated with one or more receive antennas and one or more transmit antennas. In example 900, there are two RATs: an LTE RAT associated with band B3, and an NR RAT associated with band N41. For example, the UE of example 900 may be associated with a multiple subscriber (such as multiple subscriber identity module (SIM) (MSIM)) configuration, where the NR RAT is associated with a first subscription (Sub 1) and the LTE RAT is associated with a second subscription (Sub2). Furthermore, a designated data subscriber (DDS) may be associated with the NR RAT, and a non-DDS (nDDS) may be associated with the LTE RAT. As further shown, the NR RAT (e.g., Sub 1) is associated with three receive antennas and one transmit/receive antenna, and the LTE RAT (e.g., Sub2) is associated with two receive antennas.

Some transmissions may be performed using an antenna order. An antenna order may define an order in which antennas 915 are to be sequentially used to perform a transmission. As an example, an SRS may be transmitted using an antenna order in order to improve transmit diversity. In the course of transmitting the SRS using the antenna order, the UE may switch an antenna used for a current physical uplink shared channel (PUSCH) to a different antenna used for reception in a current operating frequency channel (e.g., associated with an absolute radio-frequency channel number (ARFCN)). The base station may use the SRS for improve downlink precoding, thereby improving downlink MIMO performance. The SRS transmission may be performed periodically (e.g., in accordance with a periodicity).

The UE of example 900 may share RFFE resources (e.g., cross-switch 910, antenna 915, and/or the like) between the LTE RAT and the NR RAT. In some circumstances, a communication associated with a first RAT (e.g., the NR RAT) may utilize RFFE resources that would otherwise be used for a concurrent communication associated with a second RAT (e.g., the LTE RAT). This is referred to as a collision of the communication associated with the first RAT and the communication associated with the second RAT. In example 900, the transmission of the SRS on antenna 1 may collide with an idle mode reception operation on antenna 1. As another example, the transmission of the SRS on antenna 2 may collide with an idle mode reception operation (e.g., the same one as on antenna 1 or a different one than on antenna 1) of the second subscription. Furthermore, in some scenarios, an idle mode reception operation (such as paging reception may be periodic and may repeatedly collide with an uplink transmission on the first RAT. For example, if the uplink transmission on the first RAT is an SRS associated with an antenna order, the idle mode reception operation on the second RAT may repeatedly collide with the SRS transmission on one or more antennas based at least in part on the antenna order. Persistent collisions may impact throughput and radio link quality on the second RAT.

In such a scenario, the UE may drop the communication associated with the second RAT (which is referred to herein as blanking a communication associated with the second RAT). However, blanking the communication associated with the second RAT negatively impacts BLER on the connection associated with the second RAT, which could lead to diminished throughput and RLF.

Some techniques and apparatuses described herein provide for an antenna order of a periodic reference signal transmission to be modified based at least in part on identifying one or more collisions between the periodic reference signal transmission and another communication, such as an idle mode reception operation associated with a different subscriber than the periodic reference signal transmission. For example, the UE may identify at least one collision between the periodic reference signal transmission and the other communication and may modify the antenna order of the periodic reference signal transmission based at least in part on the at least one collision. The modified antenna order may be configured such that the at least one collision is eliminated, or so that a frequency of collisions between the periodic reference signal transmission and the other communication is reduced. For example, for an antenna order of [4 3 2 1] for transmission of an SRS, where a collision occurs on antenna 1, the antenna order may be modified to (for example) [4 3 1 2], so that the SRS transmission on antenna 1 is transmitted at a different time than the colliding collision.

In this way, an impact of collisions between periodic communications, such as collisions between NR SRS transmissions and idle mode reception operations, is reduced. Thus, throughput is improved and impact on the communication link is mitigated.

As indicated above, FIG. 9 is provided as an example. Other examples may differ from what is described with regard to FIG. 9.

Figure 10:
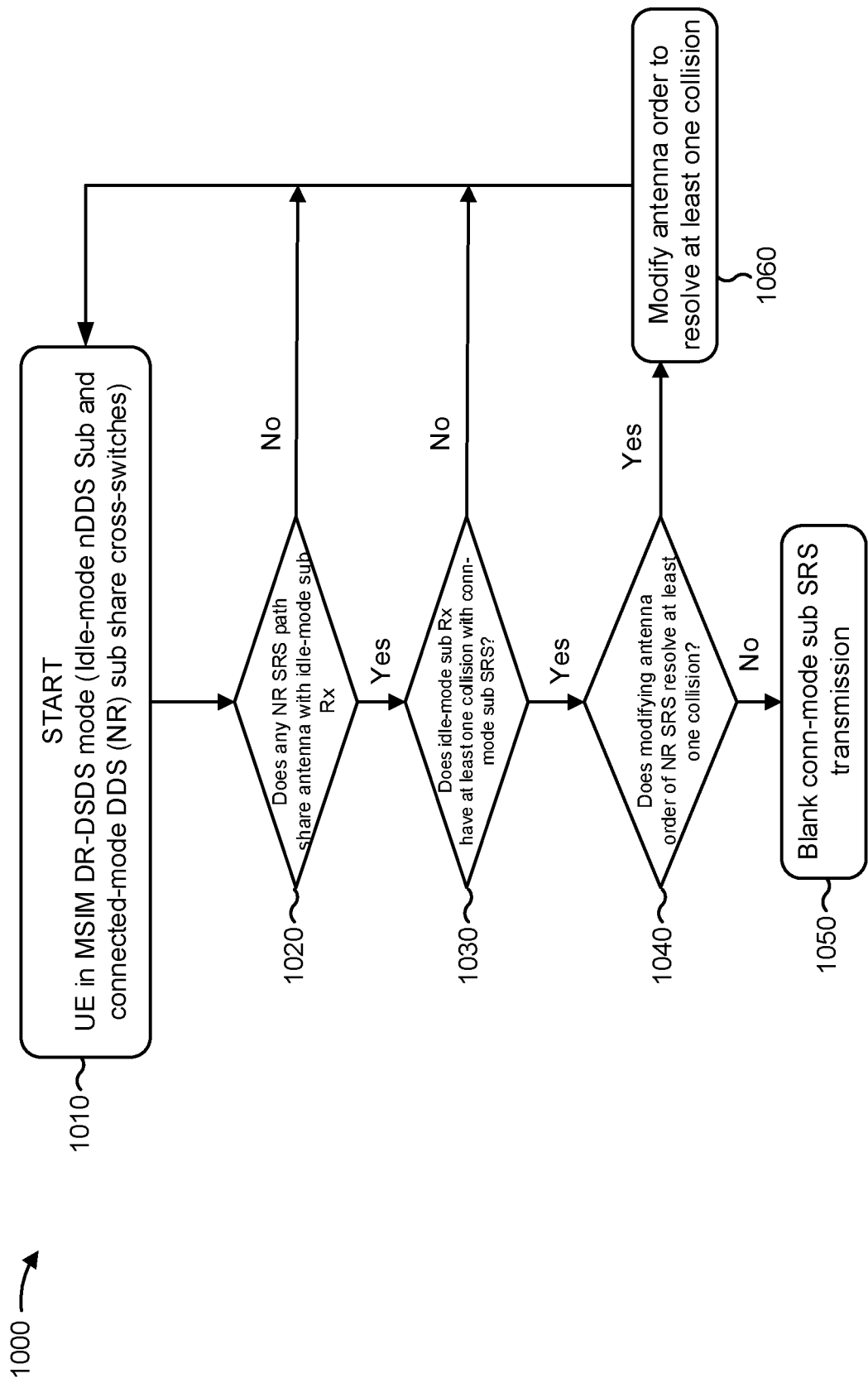
FIG. 10 is a diagram illustrating an example of identifying and mitigating a collision based at least in part on an antenna order for a reference signal transmission, in accordance with the present disclosure.

FIG. 10 is a diagram illustrating an example 1000 of identifying and mitigating a collision based at least in part on an antenna order for a reference signal transmission, in accordance with the present disclosure. The operations described with regard to FIG. 10 may be performed by a UE (e.g., UE 120, the UE of example 400, the UE 120 of FIG. 8, the UE of FIG. 9). For example, as shown by block 1010, the UE may be in an MSIM DR-DSDS mode, wherein an idle mode nDDS subscription (referred to as a second SUB) and a connected mode DDS subscription (e.g., using an NR RAT, and referred to as a first SUB) share cross-switches, as described in more detail in connection with FIG. 9. As used herein, "idle mode" and "connected mode" may refer to RRC idle mode and RRC connected mode.

As shown by block 1020, the UE may determine whether any NR SRS path shares an antenna with a reception of the second SUB (e.g., an idle mode reception). The reception of the second SUB may be referred to herein as an idle mode reception operation, and may include paging monitoring, system information reception, or measurement, among other examples. For example, the UE may perform paging monitoring activities after each idle mode DRX cycle (e.g., if a DRX cycle length is 320 ms, the idle mode nDDS sub may awaken from a sleep state every 320 ms and monitor a paging channel). Paging monitoring may typically be performed in a single slot or a single subframe, though the techniques and apparatuses described herein provide for collision detection using a longer time window, as described below. As another example, the UE may perform idle mode measurement activities, such as measurements of a serving cell (such as for intra-band idle-mode mobility or maintaining frequency and time tracking loops) or measurements of a neighbor cell (such as intra-band or inter-band measurements for mobility). As yet another example, the UE may perform system information monitoring (such as system information block (SIB) 1 (SIB-1) and SIB 2 RRC messages for idle mode).

In some aspects, the UE may determine whether any antenna of the UE is shared between an NR connection and an LTE connection. As an example, antenna 915-4 of FIG. 9 is shared between the reception of the second SUB and the SRS transmission of the first SUB. "NR SRS path" refers to a transmit path used for an NR SRS. For example, an SRS transmitted using an antenna order [4 3 2 1], as illustrated in FIG. 9, may be associated with NR SRS paths on each of antennas 915-1 through 915-4. In some aspects, the UE may determine whether any NR SRS path collides with an idle-mode receive antenna at every LTE/NR configuration or reconfiguration, or at every LTE/NR antenna switching configuration. Additionally, or alternatively, the UE may determine whether any NR SRS path collides with an idle-mode receive antenna upon idle-mode nDDS SUB (e.g., second SUB) or connected-mode SUB (e.g., DDS SUB) configuration or reconfiguration if the configuration or reconfiguration impacts the second SUB's reception periodicity or the first SUB's SRS periodicity. Furthermore, the UE may determine whether any NR SRS path collides with an idle-mode receive antenna upon receiving a configuration indicating an RF band change. If no NR SRS path shares an antenna with a reception on the second SUB (block 1020—No), the UE may return to a start of example 1000, at block 1010.

If an NR SRS path shares an antenna with a reception on the second SUB (block 1020—Yes), the UE may determine whether the reception on the second SUB is associated with a persistent collision with the NR SRS (block 1030). For example, the UE may identify one or more collisions between the reception on the second SUB and the NR SRS. In some aspects, the UE may determine whether a receive antenna of the second SUB is associated with a persistent collision with an NR SRS path at every LTE/NR configuration or reconfiguration or LTE/NR antenna switching configuration.

In some aspects, the UE may determine if a periodicity of a reception on the second SUB modulo a periodicity of an NR transmission (e.g., an SRS transmission) is zero with regard to a common time reference. For example, the UE may determine if the periodicity of the periodic reference signal transmission and the periodicity of the reception on the second SUB are aligned with each other. For example, in some examples, the second SUB's periodicity for paging is every 640 ms (e.g., due to an idle-mode paging DRX cycle having a length of 640 ms). If the second SUB's paging periodicity is 640 ms and the first SUB's SRS periodicity is 20 ms, only the SRS transmission(s) on the NR SRS path that is colliding with the second SUB's antenna(s) (where idle-mode reception may use one or two antennas) needs to be suspended. In this example, the periodicity to suspend may correspond to the second SUB's paging periodicity, which in this example is 640 ms. If the second SUB's paging periodicity is shorter than the first SUB's SRS periodicity, then from the second SUB's perspective, the paging and the SRS transmission cannot collide persistently (e.g. if the second SUB's paging periodicity is 80 ms and the SRS periodicity is 160 ms).

In some aspects, the UE may account for pre-subframe or post-subframe procedures associated with the second SUB. For example, the UE, when identifying the at least one collision, may account for the second SUB's duration to receive the reception (e.g., an NR slot or an LTE subframe plus a margin). The margin may account for pre-slot or subframe, and post-slot or subframe) procedures that may need to be protected from interruption due to the transmission of the SRS. In this case, a total duration in which to protect the second SUB's reception may include one or more of an RF tuning duration to activate or tune one or more RF chains or devices before the reception, a paging RF sample capture duration, and an RF tuning duration to deactivate or tune one or more RF chains or devices after the reception. In some aspects, the UE may account for a duration of the SRS transmission on the first SUB. For example, the UE may account for the duration of the SRS transmission in terms of a number of symbols (e.g., 1, 2, or 4 symbols) used to transmit the SRS transmission. The determination of whether there is a collision and/or a persistent collision between the SRS transmission of the first SUB and the reception of the second SUB may be based at least in part on the duration of the SRS transmission.

In some aspects, different receptions on the second RAT may have different periodicities. For example, paging may be associated with a different periodicity than measurement. As another example, paging and/or measurement may be associated with a different periodicity than system information monitoring. As yet another example, idle mode paging may be performed every discontinuous reception (DRX) cycle, idle mode measurement may be performed every 4 DRX cycles, and idle mode system information monitoring may be performed every 12 DRX cycles. In this case, if any of these periodicities has a persistent collision, the UE may identify at least one collision (e.g., may determine that a criterion for identifying a persistent collision associated with the second SUB is satisfied).

In some aspects, the UE may determine whether at least one collision is detected based at least in part on information received from an LTE protocol stack and an NR protocol stack of the UE. For example, the UE may acquire, from the LTE protocol stack and/or the NR protocol stack, information indicating a configuration for an idle mode reception (e.g., paging, measurement, system information monitoring) and an NR transmission (e.g., an SRS configuration). The UE 120 may identify the at least one collision using this information.

In some aspects, the UE may determine whether blanking of the reception of the second SUB or the NR SRS transmission of the first SUB is to be performed. For example, in some implementations, a UE may be associated with a sufficient number of antennas to perform both the reception on the second SUB and the SRS transmission on the first SUB (e.g., 10 antennas, 6 antennas, and/or the like). In such a case, if the UE is associated with a sufficient number of antennas to perform both the reception and the NR SRS transmission, the UE may determine that the reception needs not be blanked and the SRS transmission's antenna order needs not be modified, thereby conserving resources that would otherwise be used to modify the antenna order of the NR SRS transmission or blank at least one of the NR SRS transmission or the reception.

If the reception is not associated with a persistent collision with the NR SRS (block 1030—No) then the UE may return to block 1010. If the reception is associated with a persistent collision with the NR SRS (block 1030—Yes), then the UE may determine whether modifying an antenna order of the NR SRS (e.g., the transmission of the first SUB) resolves the at least one collision. For example, the UE may determine whether swapping an order of the NR SRS transmission on the SRS path resolves the persistent collision with the reception on the second SUB. If modifying the antenna order of the NR SRS does not resolve the at least one collision (block 1040—No), then the UE may blank the NR SRS transmission (block 1050). For example, the UE may blank the NR SRS transmission on a time occasion in which the NR SRS transmission collides with the reception on the LTE SUB. In some aspects, the UE may blank one or more SRS transmission instances that overlap with any portion of the LTE transmission.

If modifying the antenna order of the NR SRS resolves the at least one collision (block 1040—Yes), then the UE may modify the antenna order of the NR SRS (block 1060), and may return to block 1010. For example, the UE may determine a second antenna order that is different than a first antenna order for the NR SRS transmission. The second antenna order may be configured such that the NR SRS does not collide with the reception. In this way, an impact of periodic SRS transmission on reception of an idle mode SUB is reduced, thereby improving idle mode functionality of the second SUB.

The below pseudocode illustrates an example process relating to example 1000. In the below pseudocode, /* and */ delimit code comments. For example, "/* ABC */" is a code comment of "ABC." Lines of pseudocode are numbered sequentially.

```
1 /*Obtain default SRS transmission antenna sequence (1,2,3,4) with SRS
  transmission antenna (1) the default antenna that cannot be changed in a current
  configuration sequence, default SRS config based on ENDC band combo and
  RF front-end HW*/
2 /* Default SRS alt-path antenna: antenna-2, antenna-3, antenna-4 */
3 /* generate non-default SRS transmission antenna sequence set-B: { (1,2,4,3),
  (1,4,3,2), (1,4,2,3) , (1,3,2,4), (1,3,4,2)} */
4 /* each SRS transmission sequence has a known configured transmission
  duration with regard to NR symbol duration and known start/end of transmission
  sequence referenced to a common time reference */
5 /* MSIM idle-sub (nDDS) is doing idle Rx-only activities such as
  Page/Measurements/SystemsInfo-monitoring during idle DRX wake-ups */
6 /* collisions between conn-mode sub (DDS) SRS antenna switching and idle-
  sub (nDDS) idle-mode Rx activity applicable for shared antenna switches HW
  scenarios */
7 FOR each idle-sub (nDDS) periodic reporting item /* check for persistent
  collision */
8     SET current periodic reporting item as item-X /* item-X range is from 1
  to N where N is number of periodic configured items on idle-sub */
9     IF each idle-sub (nDDS) periodic reporting item-X collides persistently
  with NR SRS default sequence
10            Determine colliding default SRS alt-path antenna for
              item-X
11            Determine non-colliding SRS antenna sequences set for
              item-X from non-default SRS transmission sequence set B
12            Proceed to check next idle-sub (nDDS) periodic reporting
              item for persistent collision /* go to next idle-sub (nDDS)
              periodic reporting item persistent collision check */
13    END
14 END
15 FOR each idle-sub (nDDS) periodic reporting item with persistent collision
16    IF common non-colliding SRS antenna sequence set across all periodic
  reporting item > 1
17            SET SRS antenna sequence set to non-colliding SRS antenna
              sequence set with minimum idle-sub (nDDS) blanking antennas
18        ELSEIF common non-colliding SRS antenna sequence set across all
              periodic reporting item == 1
19            SET SRS antenna sequence set to non-colliding SRS antenna
              sequence set
20        ELSE
21            SUSPEND SRS antenna switching for corresponding colliding
              time occurrence /* suspend with regard to default SRS sequence */
22    END
23 END
```

In the above pseudocode, the UE determines a default SRS transmission antenna order of (1,2,3,4). The UE also generates non-default SRS transmission antenna orders of (1,2,4,3), (1,4,3,2), (1,4,2,3), (1,3,2,4), and (1,3,4,2). If the UE identifies a colliding antenna, for item-X, is antenna 4 (i.e., the last antenna of the default SRS transmission order), then the UE may select, from the non-default SRS transmission antenna orders, a set of antenna orders in which antenna 4 is in a different position in the default SRS antenna order. In this example, the UE may select one of (1,2,4,3), (1,4,3,2), (1,4,2,3), and (1,3,4,2). For example, the UE 120 select an antenna order associated with a lowest number of blanked antennas for the reception of the second SUB. The UE may set the SRS transmission's antenna order to the selected non-default SRS antenna order.

In the above pseudocode, the determination of whether to suspend SRS antenna switching for a corresponding colliding time occurrence is based at least in part on a duty cycle associated with a configurable value Y. Example values of 1, 2, 4, 8, and 16 are provided for Y. Example actions corresponding to the values of Y are provided below:

- If Y==1, then blank/suspend NR SRS alt-path antenna that is colliding persistently with idle-sub (nDDS) reception for all colliding time instance
- If Y==2, then blank/suspend NR SRS alt-path antenna that is colliding persistently with idle-sub (nDDS) reception for 1 out of 2 colliding instance
- If Y==4, then blank/suspend NR SRS alt-path antenna that is colliding persistently with idle-sub (nDDS) reception for 1 out of 4 colliding instance
- If Y==8, then blank/suspend NR SRS alt-path antenna that is colliding persistently with idle-sub (nDDS) reception for 1 out of 8 colliding instance
- If Y==16, then blank/suspend NR SRS alt-path antenna that is colliding persistently with idle-sub (nDDS) reception for 1 out of 16 colliding instance Thus, the NR SRS is blanked every Y colliding instances. In some aspects, an antenna order of the UE indicate the colliding instances that are to be blanked. In some aspects, the UE may determine the colliding instances to be blanked independently of the antenna order.

In some aspects, the UE may receive configuration information (e.g., RRC reconfiguration information for the first SUB or the second SUB) that modifies the periodicity of the SRS transmission or the reception. The UE may start from block 1010 based at least in part on receiving such information. For example, the UE (e.g., a software module of the UE) may be notified if there is an LTE or NR reconfiguration that impacts the second SUB's reception periodicity or the first SUB's SRS periodicity.

As indicated above, FIG. 10 is provided as an example. Other examples may differ from what is described with regard to FIG. 10.

Figure 11:
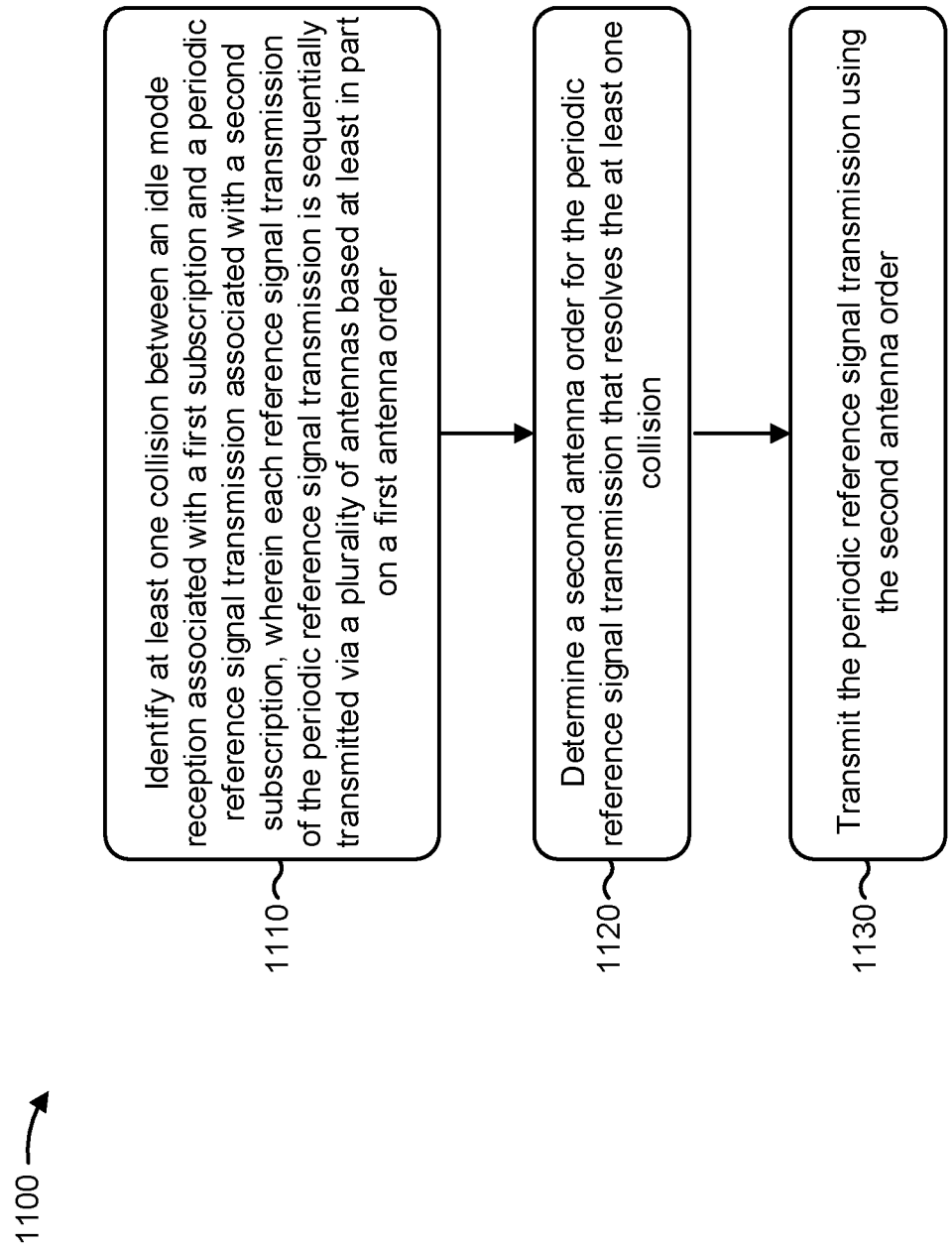
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120, the UE 120 of FIG. 3, the UE of FIG. 4, the UE 120 of FIG. 8, or the UE of FIG. 9) performs operations associated with reordering an antenna order to avoid transmit blanking.

As shown in FIG. 11, in some aspects, process 1100 may include identifying at least one collision between an idle mode reception associated with a first subscription and a periodic reference signal transmission associated with a second subscription, wherein each reference signal transmission of the periodic reference signal transmission is sequentially transmitted via a plurality of antennas based at least in part on a first antenna order (block 1110). For example, the UE (e.g., using communication manager 140 and/or identification component 708, depicted in FIG. 7) may identify at least one collision between an idle mode reception associated with a first subscription and a periodic reference signal transmission associated with a second subscription, wherein each reference signal transmission of the periodic reference signal transmission is sequentially transmitted via a plurality of antennas based at least in part on a first antenna order, as described above.

As further shown in FIG. 11, in some aspects, process 1100 may include determining a second antenna order for the periodic reference signal transmission that resolves the at least one collision (block 1120). For example, the UE (e.g., using communication manager 140 and/or determination component 710, depicted in FIG. 7) may determine a second antenna order for the periodic reference signal transmission that resolves the at least one collision, as described above. In some aspects, "resolving the at least one collision" may include partially resolving the at least one collision. For example, the second antenna order may minimize the number of remaining collisions, relative to one or more other potential antenna orders. As another example, the second antenna order may resolve the at least one collision, though other collisions may remain. As used herein, "resolving a collision" refers to eliminating the need to drop one of the periodic reference signal transmission or the reception at a time associated with the at least one collision. In some aspects, the at least one collision is a persistent collision, where a persistent collision is based at least in part on respective periodicities of the periodic reference signal transmission and the reception causing the two communications to overlap on a repeated basis.

As further shown in FIG. 11, in some aspects, process 1100 may include transmitting the periodic reference signal transmission using the second antenna order (block 1130). For example, the UE (e.g., using communication manager 140 and/or transmission component 704, depicted in FIG. 7) may transmit the periodic reference signal transmission using the second antenna order, as described above.

Process 1100 may include additional aspects, such as any single aspect or any combination of aspects described below and/or in connection with one or more other processes described elsewhere herein.

In a first aspect, the first antenna order uses a first order of the plurality of antennas and the second antenna order uses a second order of the plurality of antennas.

In a second aspect, alone or in combination with the first aspect, the idle mode reception is associated with at least one of paging, measurement, or system information monitoring, and wherein the periodic reference signal transmission is associated with a sounding reference signal.

In a third aspect, alone or in combination with one or more of the first and second aspects, process 1100 includes determining that the at least one collision can be resolved by modifying the first antenna order, wherein the determination of the second antenna order is based at least in part on the determination that the at least one collision can be resolved by modifying the first antenna order.

In a fourth aspect, alone or in combination with one or more of the first through third aspects, process 1100 includes determining that blanking of the idle mode reception is to be performed if the second antenna order is not used, wherein the determination of the second antenna order is based at least in part on the determination that blanking of the idle mode reception is to be performed if the second antenna order is not used.

In a fifth aspect, alone or in combination with one or more of the first through fourth aspects, the identification of the at least one collision is based at least in part on a periodicity of the idle mode reception and a periodicity of the periodic reporting being aligned with each other.

In a sixth aspect, alone or in combination with one or more of the first through fifth aspects, the identification of the at least one collision is based at least in part on a transmission of the periodic reference signal transmission on a particular antenna and the idle mode reception on the particular antenna overlapping with each other.

In a seventh aspect, alone or in combination with one or more of the first through sixth aspects, the second antenna order is selected from a plurality of antenna orders based at least in part on the particular antenna.

In an eighth aspect, alone or in combination with one or more of the first through seventh aspects, at least one of the identification of the at least one collision or the determination of the second antenna order is based at least in part on receiving configuration information relating to the idle mode reception or the periodic reference signal transmission.

In a ninth aspect, alone or in combination with one or more of the first through eighth aspects, the second antenna order is based at least in part on a cross-switch configuration of a radio frequency chain of the UE.

In a tenth aspect, alone or in combination with one or more of the first through ninth aspects, the second antenna order includes one or more occasions in which the periodic reference signal transmission is blanked based at least in part on a duty cycle.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The following provides an overview of some Aspects of the present disclosure:

Aspect 1: A method of wireless communication performed by a user equipment (UE), comprising: identifying at least one collision between a periodic reporting of channel state information associated with a first radio access technology (RAT) and a periodic reference signal transmission associated with a second RAT, wherein each reference signal transmission of the periodic reference signal transmission is sequentially transmitted via a plurality of antennas based at least in part on a first antenna order; and determining a second antenna order for the periodic reference signal transmission that resolves the at least one collision; and transmitting the periodic reference signal transmission using the second antenna order.

Aspect 2: The method of Aspect 1, wherein the first antenna order uses a first order of the plurality of antennas and the second antenna order uses a second order of the plurality of antennas.

Aspect 3: The method of Aspect 1, wherein the periodic reporting is associated with a channel quality indicator or a rank indicator, and wherein the periodic reference signal transmission is associated with a sounding reference signal.

Aspect 4: The method of Aspect 1, further comprising: determining that the at least one collision can be resolved by modifying the first antenna order, wherein the determination of the second antenna order is based at least in part on the determination that the at least one collision can be resolved by modifying the first antenna order.

Aspect 5: The method of Aspect 1, further comprising: determining that blanking of the periodic reporting associated with the first RAT is to be performed if the second antenna order is not used, wherein the determination of the second antenna order is based at least in part on the determination that blanking of the periodic reporting associated with the first RAT is to be performed if the second antenna order is not used.

Aspect 6: The method of Aspect 1, wherein the identification of the at least one collision is based at least in part on a periodicity of the periodic reference signal transmission and a periodicity of the periodic reporting being aligned with each other.

Aspect 7: The method of Aspect 6, wherein the identification of the at least one collision is based at least in part on a transmission of the periodic reference signal transmission on a particular antenna and a transmission of the periodic reporting on the particular antenna overlapping with each other.

Aspect 8: The method of Aspect 7, wherein the second antenna order is selected from a plurality of antenna orders based at least in part on the particular antenna.

Aspect 9: The method of Aspect 1, wherein at least one of the identification of the at least one collision or the determination of the second antenna order is based at least in part on receiving configuration information relating to the periodic reporting or the periodic reference signal transmission.

Aspect 10: The method of Aspect 1, wherein the second antenna order is based at least in part on a cross-switch configuration of a radio frequency chain of the UE.

Aspect 11: The method of Aspect 1, wherein the second antenna order includes one or more occasions in which the periodic reference signal transmission is blanked based at least in part on a duty cycle.

Aspect 12: A method of wireless communication performed by a user equipment (UE), comprising: identifying at least one collision between an idle mode reception associated with a first subscription and a periodic reference signal transmission associated with a second subscription, wherein each reference signal transmission of the periodic reference signal transmission is sequentially transmitted via a plurality of antennas based at least in part on a first antenna order; and determining a second antenna order for the periodic reference signal transmission that resolves the at least one collision; and transmitting the periodic reference signal transmission using the second antenna order.

Aspect 13: The method of Aspect 12, wherein the first antenna order uses a first order of the plurality of antennas and the second antenna order uses a second order of the plurality of antennas.

Aspect 14: The method of Aspect 12, wherein the idle mode reception is associated with at least one of paging, measurement, or system information monitoring, and wherein the periodic reference signal transmission is associated with a sounding reference signal.

Aspect 15: The method of Aspect 12, further comprising: determining that the at least one collision can be resolved by modifying the first antenna order, wherein the determination of the second antenna order is based at least in part on the determination that the at least one collision can be resolved by modifying the first antenna order.

Aspect 16: The method of Aspect 12, further comprising: determining that blanking of the idle mode reception is to be performed if the second antenna order is not used, wherein the determination of the second antenna order is based at least in part on the determination that blanking of the idle mode reception is to be performed if the second antenna order is not used.

Aspect 17: The method of Aspect 12, wherein the identification of the at least one collision is based at least in part on a periodicity of the idle mode reception and a periodicity of the periodic reporting being aligned with each other.

Aspect 18: The method of Aspect 17, wherein the identification of the at least one collision is based at least in part on a transmission of the periodic reference signal transmission on a particular antenna and the idle mode reception on the particular antenna overlapping with each other.

Aspect 19: The method of Aspect 18, wherein the second antenna order is selected from a plurality of antenna orders based at least in part on the particular antenna.

Aspect 20: The method of Aspect 12, wherein at least one of the identification of the at least one collision or the determination of the second antenna order is based at least in part on receiving configuration information relating to the idle mode reception or the periodic reference signal transmission.

Aspect 21: The method of Aspect 12, wherein the second antenna order is based at least in part on a cross-switch configuration of a radio frequency chain of the UE.

Aspect 22: The method of Aspect 12, wherein the second antenna order includes one or more occasions in which the periodic reference signal transmission is blanked based at least in part on a duty cycle.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    identifying at least one collision between a periodic reporting of channel state information associated with a first radio access technology (RAT) and a periodic reference signal transmission associated with a second RAT, wherein each reference signal transmission of the periodic reference signal transmission is sequentially transmitted via at least one of a plurality of antennas based at least in part on a first antenna order; and
    determining a second antenna order for the periodic reference signal transmission that resolves the at least one collision; and
    transmitting the periodic reference signal transmission using the second antenna order.

2. The method of claim 1, wherein the first antenna order uses a first order of the plurality of antennas and the second antenna order uses a second order of the plurality of antennas, wherein the first order and the second order are different.

3. The method of claim 1, wherein the periodic reporting is associated with a channel quality indicator or a rank indicator, and wherein the periodic reference signal transmission is associated with a sounding reference signal.

4. The method of claim 1, further comprising:
    determining that the at least one collision can be resolved by modifying the first antenna order, wherein the determination of the second antenna order is based at least in part on the determination that the at least one collision can be resolved by modifying the first antenna order.

5. The method of claim 1, further comprising:
    determining that blanking of the periodic reporting associated with the first RAT is to be performed if the second antenna order is not used, wherein the determination of the second antenna order is based at least in part on the determination that blanking of the periodic reporting associated with the first RAT is to be performed if the second antenna order is not used.

6. The method of claim 1, wherein the identification of the at least one collision is based at least in part on a periodicity of the periodic reference signal transmission and a periodicity of the periodic reporting being aligned with each other.

7. The method of claim 6, wherein the identification of the at least one collision is based at least in part on a transmission of the periodic reference signal transmission on a particular antenna and a transmission of the periodic reporting on the particular antenna overlapping with each other.

8. The method of claim 7, wherein the second antenna order is selected from a plurality of antenna orders based at least in part on the particular antenna.

9. The method of claim 1, wherein at least one of the identification of the at least one collision or the determination of the second antenna order is based at least in part on receiving configuration information relating to the periodic reporting or the periodic reference signal transmission.

10. The method of claim 1, wherein the second antenna order is based at least in part on a cross-switch configuration of a radio frequency chain of the UE.

11. The method of claim 1, wherein the second antenna order includes one or more occasions in which the periodic reference signal transmission is blanked based at least in part on a duty cycle.

12. A method of wireless communication performed by a user equipment (UE), comprising:
identifying at least one collision between an idle mode reception associated with a first subscription and a periodic reference signal transmission associated with a second subscription, wherein each reference signal transmission of the periodic reference signal transmission is sequentially transmitted via at least one of a plurality of antennas based at least in part on a first antenna order; and
determining a second antenna order for the periodic reference signal transmission that resolves the at least one collision; and
transmitting the periodic reference signal transmission using the second antenna order.

13. The method of claim 12, wherein the first antenna order uses a first order of the plurality of antennas and the second antenna order uses a second order of the plurality of antennas, wherein the first order and the second order are different.

14. The method of claim 12, wherein the idle mode reception is associated with at least one of paging, measurement, or system information monitoring, and wherein the periodic reference signal transmission is associated with a sounding reference signal.

15. The method of claim 12, further comprising:
determining that the at least one collision can be resolved by modifying the first antenna order, wherein the determination of the second antenna order is based at least in part on the determination that the at least one collision can be resolved by modifying the first antenna order.

16. The method of claim 12, wherein the identification of the at least one collision is based at least in part on a periodicity of the idle mode reception and a periodicity of the periodic reporting being aligned with each other.

17. The method of claim 16, wherein the identification of the at least one collision is based at least in part on a transmission of the periodic reference signal transmission on a particular antenna and the idle mode reception on the particular antenna overlapping with each other.

18. The method of claim 17, wherein the second antenna order is selected from a plurality of antenna orders based at least in part on the particular antenna.

19. The method of claim 12, wherein at least one of the identification of the at least one collision or the determination of the second antenna order is based at least in part on receiving configuration information relating to the idle mode reception or the periodic reference signal transmission.

20. The method of claim 12, wherein the second antenna order is based at least in part on a cross-switch configuration of a radio frequency chain of the UE.

21. The method of claim 12, wherein the second antenna order includes one or more occasions in which the periodic reference signal transmission is blanked based at least in part on a duty cycle.

22. The method of claim 12, wherein the first subscription is in an idle mode and the second subscription is in a connected mode.

23. A user equipment (UE) for wireless communication, comprising:
a memory; and
one or more processors operatively to the memory, the one or more processors configured to:
identify at least one collision between a periodic reporting of channel state information associated with a first radio access technology (RAT) and a periodic reference signal transmission associated with a second RAT, wherein each reference signal transmission of the periodic reference signal transmission is sequentially transmitted via at least one of a plurality of antennas based at least in part on a first antenna order; and
determine a second antenna order for the periodic reference signal transmission that resolves the at least one collision; and
transmit the periodic reference signal transmission using the second antenna order.

24. The UE of claim 23, wherein the first antenna order uses a first order of the plurality of antennas and the second antenna order uses a second order of the plurality of antennas, wherein the first order and the second order are different.

25. The UE of claim 23, wherein the periodic reporting is associated with a channel quality indicator or a rank indicator, and wherein the periodic reference signal transmission is associated with a sounding reference signal.

26. The UE of claim 23, wherein the one or more processors are further configured to:
determine that the at least one collision can be resolved by modifying the first antenna order, wherein the determination of the second antenna order is based at least in part on the determination that the at least one collision can be resolved by modifying the first antenna order.

27. A user equipment (UE) for wireless communication, comprising:
a memory; and
one or more processors coupled to the memory, the one or more processors configured to:
identify at least one collision between an idle mode reception associated with a first subscription and a periodic reference signal transmission associated with a second subscription, wherein each reference signal transmission of the periodic reference signal transmission is sequentially transmitted via at least one of a plurality of antennas based at least in part on a first antenna order; and determine a second antenna order for the periodic reference signal transmission that resolves the at least one collision; and transmit the periodic reference signal transmission using the second antenna order.

28. The UE of claim 27, wherein the first antenna order uses a first order of the plurality of antennas and the second antenna order uses a second order of the plurality of antennas, wherein the first order and the second order are different.

29. The UE of claim 27, wherein the idle mode reception is associated with at least one of paging, measurement, or system information monitoring, and wherein the periodic reference signal transmission is associated with a sounding reference signal.

30. The UE of claim 27, wherein the one or more processors are configured to:

determine that the at least one collision can be resolved by modifying the first antenna order, wherein the determination of the second antenna order is based at least in part on the determination that the at least one collision can be resolved by modifying the first antenna order.

* * * * *